US012394411B2

(12) United States Patent
Singh et al.

(10) Patent No.: US 12,394,411 B2
(45) Date of Patent: Aug. 19, 2025

(54) DOMAIN SPECIFIC NEURAL SENTENCE GENERATOR FOR MULTI-DOMAIN VIRTUAL ASSISTANTS

(71) Applicant: SoundHound, Inc., Santa Clara, CA (US)

(72) Inventors: Pranav Singh, Sunnyvale, CA (US); Yilun Zhang, Toronto (CA); Eunjee Na, Busan (KR); Olivia Bettaglio, Santa Clara, CA (US)

(73) Assignee: SoundHound AI IP, LLC., Santa Clara, CA (US)

( * ) Notice: Subject to any disclaimer, the term of this patent is extended or adjusted under 35 U.S.C. 154(b) by 272 days.

(21) Appl. No.: 18/050,182

(22) Filed: Oct. 27, 2022

(65) Prior Publication Data

US 2024/0144921 A1     May 2, 2024

(51) Int. Cl.
*G10L 15/18*     (2013.01)
*G10L 15/06*     (2013.01)
*G10L 15/22*     (2006.01)

(52) U.S. Cl.
CPC ........ *G10L 15/1815* (2013.01); *G10L 15/063* (2013.01); *G10L 15/1822* (2013.01);
(Continued)

(58) Field of Classification Search
CPC ............... G10L 15/1815; G10L 15/063; G10L 15/1822; G10L 15/22; G10L 2015/0631;
(Continued)

(56) References Cited

U.S. PATENT DOCUMENTS 8,812,316 B1    8/2014  Chen
10,452,782 B1   10/2019 Kumar et al.
(Continued)

FOREIGN PATENT DOCUMENTS

EP      3486842 A1      5/2019
WO      2018200979 A1   11/2018

OTHER PUBLICATIONS

Examination Report by EPO of European counterpart patent application No. 21180858.9, dated Sep. 10, 2024.
(Continued)

*Primary Examiner* — Daniel C Washburn
*Assistant Examiner* — Paul J. Mueller
(74) *Attorney, Agent, or Firm* — Platinum Intellectual Property PC

(57) ABSTRACT

Automatically generating sentences that a user can say to invoke a set of defined actions performed by a virtual assistant are disclosed. A sentence is received and keywords are extracted from the sentence. Based on the keywords, additional sentences are generated. A classifier model is applied to the generated sentences to determine a sentence that satisfies a threshold. In the situation a sentence satisfies the threshold, an intent associated with the classifier model can be invoked. In the situation the sentences fail to satisfy the classifier model, the virtual assistant can attempt to interpret the received sentence according to the most likely intent by invoking a sentence generation model fine-tuned for a particular domain, generate additional sentences with a high probability of having the same intent and fulfill the specific action defined by the intent.

23 Claims, 11 Drawing Sheets

(52) U.S. Cl.
CPC ...... *G10L 15/22* (2013.01); *G10L 2015/0631* (2013.01); *G10L 2015/223* (2013.01)

(58) Field of Classification Search
CPC ......... G10L 2015/223; G10L 2015/088; G06F 40/284; G06F 40/247; G06F 40/295; G06F 40/30

See application file for complete search history.

(56) References Cited

U.S. PATENT DOCUMENTS

| | | | |
|---|---|---|---|
| 10,515,155 | B2 | 12/2019 | Bachrach et al. |
| 11,580,959 | B2 | 2/2023 | Freed et al. |
| 2002/0082833 | A1 | 6/2002 | Marasek et al. |
| 2002/0133340 | A1 | 9/2002 | Basson et al. |
| 2006/0129381 | A1* | 6/2006 | Wakita ............... G06F 40/45 704/9 |
| 2006/0195318 | A1 | 8/2006 | Stanglmayr |
| 2007/0033026 | A1 | 2/2007 | Bartosik et al. |
| 2007/0208567 | A1 | 9/2007 | Amento et al. |
| 2010/0106505 | A1 | 4/2010 | Shu |
| 2011/0218802 | A1 | 9/2011 | Bouganim et al. |
| 2012/0059838 | A1 | 3/2012 | Berntson et al. |
| 2013/0018649 | A1 | 1/2013 | Deshmukh et al. |
| 2015/0179169 | A1 | 6/2015 | John et al. |
| 2016/0155436 | A1 | 6/2016 | Choi et al. |
| 2016/0180242 | A1* | 6/2016 | Byron ............... G06N 5/041 706/11 |
| 2016/0196820 | A1 | 7/2016 | Williams et al. |
| 2017/0161373 | A1 | 6/2017 | Goyal et al. |
| 2017/0200458 | A1 | 7/2017 | Kang et al. |
| 2017/0286869 | A1 | 10/2017 | Zarosim et al. |
| 2018/0061408 | A1 | 3/2018 | Andreas et al. |
| 2018/0068653 | A1 | 3/2018 | Trawick et al. |
| 2018/0121419 | A1 | 5/2018 | Lee et al. |
| 2018/0329883 | A1 | 11/2018 | Leidner et al. |
| 2019/0108257 | A1 | 4/2019 | Lefebure et al. |
| 2019/0147104 | A1* | 5/2019 | Wu ............... G10L 15/22 707/737 |
| 2019/0155905 | A1 | 5/2019 | Bachrach et al. |
| 2019/0251165 | A1 | 8/2019 | Bachrach et al. |
| 2019/0278841 | A1 | 9/2019 | Pusateri et al. |
| 2019/0370323 | A1 | 12/2019 | Davidson et al. |
| 2020/0004787 | A1 | 1/2020 | Gupta et al. |
| 2020/0034357 | A1 | 1/2020 | Panuganty et al. |
| 2020/0065334 | A1* | 2/2020 | Rodriguez ............... G06F 40/35 |
| 2020/0142888 | A1 | 5/2020 | Alakuijala et al. |
| 2020/0142959 | A1 | 5/2020 | Mallinar et al. |
| 2020/0143247 | A1* | 5/2020 | Jonnalagadda ......... G06N 3/044 |
| 2020/0167379 | A1 | 5/2020 | Faruqui et al. |
| 2020/0334334 | A1 | 10/2020 | Keskar et al. |
| 2021/0042614 | A1 | 2/2021 | Walters et al. |
| 2021/0056266 | A1 | 2/2021 | Ma et al. |
| 2021/0110816 | A1 | 4/2021 | Choi et al. |
| 2021/0118436 | A1 | 4/2021 | Kim et al. |
| 2021/0141798 | A1 | 5/2021 | Henderson |
| 2021/0141799 | A1* | 5/2021 | Steedman Henderson ................... G06N 3/045 |
| 2021/0142164 | A1 | 5/2021 | Liu et al. |
| 2021/0142789 | A1 | 5/2021 | Gurbani et al. |
| 2021/0149993 | A1 | 5/2021 | Torres |
| 2021/0151039 | A1 | 5/2021 | Wu et al. |
| 2021/0209304 | A1* | 7/2021 | Yang ............... G06F 40/295 |
| 2021/0264115 | A1* | 8/2021 | Wang ............... G06F 16/26 |
| 2021/0397610 | A1 | 12/2021 | Singh et al. |
| 2022/0004717 | A1* | 1/2022 | Park ............... G06F 40/216 |
| 2022/0059095 | A1 | 2/2022 | Faria et al. |
| 2022/0093088 | A1 | 3/2022 | Rangarajan Sridhar et al. |
| 2022/0165257 | A1 | 5/2022 | Singh et al. |
| 2022/0215159 | A1 | 7/2022 | Qian et al. |
| 2023/0044079 | A1* | 2/2023 | Bala ............... G06V 40/20 |
| 2023/0143110 | A1* | 5/2023 | Han ............... G06F 40/268 704/9 |
| 2023/0186898 | A1 | 6/2023 | Weisz et al. |
| 2023/0401251 | A1 | 12/2023 | Majkowska et al. |

OTHER PUBLICATIONS

U.S. Appl. No. 17/455,727, filed Nov. 19, 2021, Ranav Singh.

Li, Zichao, et al., "Decomposable neural paraphrase generation." arXiv preprint arXiv:1906.09741 (Year: 2019).

Agnihotri, Souparni. "Hyperparameter Optimization on Neural Machine Translation." (2019).

Cer, Daniel, Yinfei Yang, Sheng-yi Kong, Nan Hua, Nicole Limtiaco, Rhomni St John, Noah Constant et al. "Universal Sentence Encoder for English." EMNLP 2018 (2018): 169.

Dyer, Chris, Adhiguna Kuncoro, Miguel Ballesteros, and Noah A. Smith. "Recurrent neural network grammars." arXiv preprint arXiv:1602.07776 (2016).

Extended European Search Report of EP21180858.9 by EPO dated Apr. 5, 2022.

Geitgey, A. "Faking the News with Natural Language Processing and GPT-2." Medium. Sep. 27, 2019.

Guu, Kelvin, Tatsunori B. Hashimoto, Yonatan Oren, and Percy Liang. "Generating sentences by editing prototypes." Transactions of the Association for Computational Linguistics 6 (2018): 437-450.

Hashemi, Homa B., Amir Asiaee, and Reiner Kraft. "Query intent detection using convolutional neural networks." In International Conference on Web Search and Data Mining, Workshop on Query Understanding. 2016.

Juraska, Juraj, and Marilyn Walker. "Characterizing variation in crowd-sourced data for training neural language generators to produce stylistically varied outputs." arXiv preprint arXiv:1809.05288 (2018).

Karagkiozis, Nikolaos. "Clustering Semantically Related Questions." (2019).

Klein, Guillaume, François Hernandez, Vincent Nguyen, and Jean Senellart. "The OpenNMT neural machine translation toolkit: 2020 edition." In Proceedings of the 14th Conference of the Association for Machine Translation in the Americas (AMTA 2020), pp. 102-109. 2020.

Kriz, Reno, Joao Sedoc, Marianna Apidianaki, Carolina Zheng, Gaurav Kumar, Eleni Miltsakaki, and Chris Callison-Burch. "Complexity-weighted loss and diverse reranking for sentence simplification." arXiv preprint arXiv:1904.02767 (2019).

Lebret, Rémi, Pedro O. Pinheiro, and Ronan Collobert. "Simple image description generator via a linear phrase-based approach." arXiv preprint arXiv:1412.8419 (2014).

Lewis, Mike, Yinhan Liu, Naman Goyal, Marjan Ghazvininejad, Abdelrahman Mohamed, Omer Levy, Ves Stoyanov, and Luke Zettlemoyer. "Bart: Denoising sequence-to-sequence pre-training for natural language generation, translation, and comprehension." arXiv preprint arXiv:1910.13461 (2019).

Li, Zichao, Xin Jiang, Lifeng Shang, and Qun Liu. "Decomposable neural paraphrase generation." arXiv preprint arXiv:1906.09741 (2019).

Lin, Ting-En, Hua Xu, and Hanlei Zhang. "Discovering new intents via constrained deep adaptive clustering with cluster refinement." In Proceedings of the AAAI Conference on Artificial Intelligence, vol. 34, No. 05, pp. 8360-8367. 2020.

OpenNMT, Models—OpenNMT, https://opennmt.net/OpenNMT/training/models/.

Radford, Alec, Jeffrey Wu, Rewon Child, David Luan, Dario Amodei, and Ilya Sutskever. "Language models are unsupervised multitask learners." OpenAI blog 1, No. 8 (2019): 9.

Rajapakse, T. "To Distil or Not To Distil: BERT, RoBERTa, and XLNet" towardsdatascience.com. Feb. 7, 2020.

Reimers, Nils, and Iryna Gurevych. "Sentence-bert: Sentence embeddings using siamese bert-networks." arXiv preprint arXiv:1908.10084 (2019).

Shaw, Andrew. "A multitask music model with bert, transformer-xl and seq2seq."

Tran, Van-Khanh, and Le-Minh Nguyen. "Semantic refinement gru-based neural language generation for spoken dialogue systems." In International Conference of the Pacific Association for Computational Linguistics, pp. 63-75. Springer, Singapore, 2017.

Vaswani, Ashish, Noam Shazeer, Niki Parmar, Jakob Uszkoreit, Llion Jones, Aidan N. Gomez, Lukasz Kaiser, and Illia Polosukhin. "Attention is all you need." arXiv preprint arXiv:1706.03762 (2017).

(56) References Cited

OTHER PUBLICATIONS

Vaswani, Ashish, Noam Shazeer, Niki Parmar, Jakob Uszkoreit, Llion Jones, Aidan N. Gomez, Łukasz Kaiser, and Illia Polosukhin. "Attention is all you need." In Advances in neural information processing systems, pp. 5998-6008. 2017.
Vinyals, Oriol, Alexander Toshev, Samy Bengio, and Dumitru Erhan. "Show and tell: A neural image caption generator." In Proceedings of the IEEE conference on computer vision and pattern recognition, pp. 3156-3164. 2015.
Wang, Peng, Bo Xu, Jiaming Xu, Guanhua Tian, Cheng-Lin Liu, and Hongwei Hao. "Semantic expansion using word embedding clustering and convolutional neural network for improving short text classification." Neurocomputing 174 (2016): 806-814.
Wen, Tsung-Hsien, Milica Gasic, Nikola Mrksic, Lina M. Rojas-Barahona, Pei-Hao Su, David Vandyke, and Steve Young. "Multi-domain neural network language generation for spoken dialogue systems." arXiv preprint arXiv:1603.01232 (2016).
Wen, Tsung-Hsien, Milica Gaic, Nikola Mrkšic, Lina M. Rojas-Barahona, Pei-Hao Su, David Vandyke, and Steve Young. "Toward multi-domain language generation using recurrent neural networks." In NIPS Workshop on Machine Learning for Spoken Language Understanding and Interaction. 2015.
Xu, Jiaming, Bo Xu, Peng Wang, Suncong Zheng, Guanhua Tian, and Jun Zhao. "Self-taught convolutional neural networks for short text clustering." Neural Networks 88 (2017): 22-31.
Zhang, Yaoyuan, Zhenxu Ye, Yansong Feng, Dongyan Zhao, and Rui Yan. "A constrained sequence-to-sequence neural model for sentence simplification." arXiv preprint arXiv:1704.02312 (2017).
Zheng, Renjie, Mingbo Ma, and Liang Huang. "Multi-reference training with pseudo-references for neural translation and text generation." arXiv preprint arXiv:1808.09564 (2018).
KIPO office action of counterpart Korean patent application No. 2021-0080973, dated Jan. 24, 2025.
JPO office action of counterpart JP patent application No. 2021-103263, dated Dec. 24, 2024.

* cited by examiner

DOMAIN SPECIFIC NEURAL SENTENCE GENERATOR FOR MULTI-DOMAIN VIRTUAL ASSISTANTS

BACKGROUND

As people are increasingly utilizing a variety of computing devices, including portable devices such as tablet computers and smart phones, it can be advantageous to adapt the ways in which people interact with these devices. Voice-enabled virtual assistants have become widely accepted because they provide a natural interface for human-machine communication. As a natural mode of human communication, voice control offers many benefits over traditional computer interfaces such as a keyboard and mouse. For example, various virtual assistants, such as an Amazon Alexa, a Google Home, or an Apple HomePod, can understand a user's voice queries and respond with voice answers or actions. In addition, virtual assistants with other interfaces, such as the traditional text interface in a chatbot, can understand a user's text questions and respond with answers or actions.

To enable a virtual assistant to function in a specific environment, developers or users often use a configurable software development framework to create actions or tasks for the virtual assistant. As a result, the virtual assistant can understand the user's voice commands and trigger identified actions or tasks.

However, conventional virtual assistants typically need to understand every possible way a user might say to describe the same request to complete actions requested by the user. This creates a unique challenge as there are endless ways to describe one request in natural human language. As a result, the virtual assistant often fails to recognize or handle a request that is slightly different from a standard or defined way of describing it.

SUMMARY OF THE INVENTION

Systems and methods in accordance with various embodiments of the present disclosure may overcome one or more of the aforementioned and other deficiencies experienced in conventional approaches to sentence generation. In particular, various embodiments described herein provide for sentence generation models for virtual assistants (e.g., voice systems, text-based chatbots, etc.) and methods of training a machine learning system to map queries that include a sentence (e.g., spoken utterance, text utterance, etc.) associated with an intent to a revised sentence having substantially the same intent.

In an embodiment, approaches provide for automatically generating potential phrases, utterances, or sentences that a user can say to invoke a set of defined actions, i.e., an intent, performed by a virtual assistant. Example intents include an order intent, an add intent, a remove intent, an order status intent, a completion intent, etc. According to some embodiments, neural network language models can be trained to generate such phrases, utterances, or sentences via unsupervised learning.

In an example, an initial query that includes a sentence (e.g., spoken utterance, text utterance, etc.) can be received at a virtual assistant interpretation service. The sentence can be received at, e.g., an ordering pole at a restaurant that is in communication with the virtual assistant interpretation service. The virtual assistant interpretation service can interpret queries for one or more virtual assistants. In this example, the query can be a request associated with a food order. For example, the query can be "give me a burger".

A classifier model can be applied to the query to determine whether the sentence satisfies a threshold (e.g., a correctness threshold). In the situation the virtual assistant interpretation service understands the query (e.g., a correctness score associated with the sentence satisfies the threshold), the query can be fulfilled in accordance with one or more configured modalities, including, e.g., providing an audio output (e.g., a voice response), a text response, and/or a visual response, such as one or more frames of video. In the situation the virtual assistant interpretation service does not understand the query, the virtual assistant interpretation service can attempt to interpret the request according to the most likely intent by invoking a sentence generation model (e.g., NLG model) fine-tuned for a particular domain or application (e.g., restaurant domain or application), generate one or more sentences with a high probability of having the same intent, return those sentences as a response, output, or revised query, and fulfill the specific action defined by the intent.

In certain embodiments, a trained classifier model can compute correctness scores for the sentences and select one or more sentences with correctness scores satisfying a threshold. According to some embodiments, the threshold value can be empirically predetermined or dynamically adapted.

According to some embodiments, the trained classifier model can further map sentences to a specific intent to determine one or more sentences with a high probability of having the same intent, wherein the classifier model has been trained by sentences that are known to invoke the intent.

According to some embodiments, the sentences can be a number of likely spoken phrases mapped to a customized or specific intent. They can include as many representative phrases as possible. Each generated sentence can comprise the words and phrases a user can say to invoke a customized or specific intent. Each intent can be mapped to a number of sentences. The sentences can comprise placeholders, e.g., arguments, representing a specific type of word such as dates, times, and locations.

In certain embodiments, obtaining training data including query data samples, the query data samples including pairs of text data representing queries and responses; calculating vector representations of the pairs of text data; and clustering the vector representations.

In certain embodiments, approaches further include replacing the text data for tagged named entities with a named entity type tag, wherein the classifier model recognizes named entity tags.

In certain embodiments, a given vector representation includes at least a response vector representation, the response vector representation being a vector representation of data representing a response to a query, the response vector representation being paired with data representing a corresponding query, and wherein clustering the vector representations includes: clustering response vector representations based on distances between the response vector representations within vector space.

In certain embodiments, approaches further include obtaining training data including query data samples, the query data samples including pairs of text data representing queries and responses and corresponding keywords; and training the sentence generation model using the pairs of text data and the corresponding keywords.

In certain embodiments the received sentence includes one or more spoken phrases that a user can speak to invoke the intent, and wherein the intent invokes one or more defined actions.

In some aspects, the techniques described herein relate to a computer-implemented method, wherein extracting the one or more keywords from the sentence is based on a keyword extraction model.

In certain embodiments, approaches further include replacing at least one keyword with a placeholder representing a specific type of word.

In certain embodiments the sentence generation model is a general-purpose natural language generation model fine-tuned by at least one of associated keywords combined with corresponding sentences, domain-specific datasets, and domain identifiers.

In certain embodiments, approaches further include computing, via the classifier model, correctness scores for the generated sentences; and selecting at least one generated sentence with a correctness score satisfying the threshold, wherein the sentence that satisfies the threshold is associated with a highest correctness score.

In certain embodiments the classifier model has been trained by supported sentences that are known to invoke the intent.

Instructions for causing a computer system to automatically generate potential sample phrases, utterances, or sentences that a user can say to invoke a set of defined actions, i.e., an intent, performed by a virtual assistant in accordance with the present disclosure may be embodied on a computer readable medium. For example, in accordance with an embodiment, a backend system can receive a query that includes a sentence (e.g., spoken utterance, text utterance, etc.) The backend system can generate code for execution by a computer, the code implementing a classifier model to determine whether the sentence satisfies a threshold. In the situation the backend system understands the query, e.g., satisfies the threshold, the system can fulfill the query. In the situation the backend system does not understand the query, the system can attempt to interpret the query according to the most likely intent by invoking a sentence generation model fine-tuned for a particular domain or application, generate one or more sentences with a high probability of having the same intent, return those sentences as a response, output, or revised query, and fulfill the specific action defined by the intent.

Embodiments provide a variety of advantages. For example, in accordance with various embodiments, computer-based approaches for automatically generating potential sentences that a user can say to invoke a set of defined actions by a virtual assistant can be utilized by content providers, device manufacturers, etc., and consumers of the content providers and device manufacturers. Virtual assistant interpretation services and approaches can improve the operation and performance of the computing devices on which they are implemented by, among other advantages, generating computer code for configuring a virtual assistant by saving a developer's effort to imagine, write and verify every possible way a user can say to describe a specific query. In addition, as these numerous sample sentences have been vetted by a trained neural network model, e.g., a classifier model, they can substantially improve the accuracy and effectiveness of a virtual assistant in understanding a user's spoken query. As a result, the virtual assistant can correctly interpret the users' requests, from which the proper responses and actions are generated. Further, by rendering a more intelligent virtual assistant that can understand various ways of describing the same query, the present subject matter can significantly enhance the user experience of a virtual assistant.

Further still, approaches result in a trained machine learning system for processing queries that improves performance by mapping ill-formed and potentially noisy or ambiguous initial queries to a revised query having the same intent as the initial query. This revised query may thus be supplied to a virtual assistant to fulfill the specific action defined by the intent.

Various other functions and advantages are described and suggested below as may be provided in accordance with the various embodiments.

DESCRIPTION OF DRAWINGS

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

The present subject matter pertains to improved approaches to automatically generate sentences or phrases that a user can say to invoke an intent by a virtual assistant or other such system. Such sentences can be generated by a pre-trained neural network sentence generator that is fine-tuned by customized or specific-purposed datasets. Embodiments of the present subject matter are discussed below with reference to the figures.

In the following description, for purposes of explanation, numerous specific details are set forth in order to provide a thorough understanding of the present subject matter. It will be apparent, however, to one skilled in the art that the present subject matter may be practiced without some of these specific details. In addition, the following description provides examples, and the accompanying drawings show various examples for the purposes of illustration. Moreover, these examples should not be construed in a limiting sense as they are merely intended to provide examples of embodiments of the subject matter rather than to provide an exhaustive list of all possible implementations. In other instances, well-known structures and devices are shown in block diagram form in order to avoid obscuring the details of the disclosed features of various described embodiments.

The following sections describe systems of process steps and systems of machine components for the automatic generation of sample sentences. These can be implemented with computers that execute software instructions stored on non-transitory computer readable media. Improved systems for transcribing and editing transcripts can have one or more of the features described below.

Figure 1A:
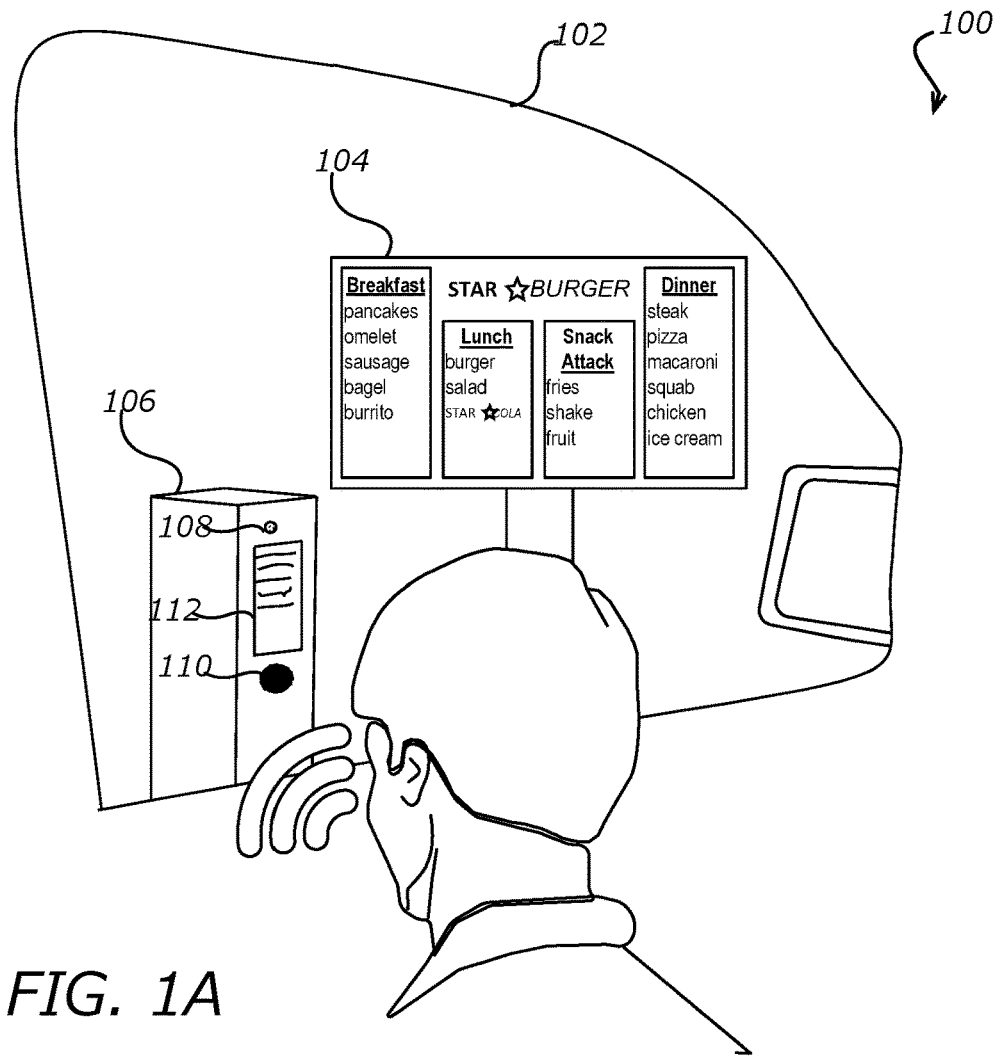
FIGS. 1A and 1B illustrate examples of a user interacting with a virtual assistant in accordance with embodiments herein.
Figure 1B:
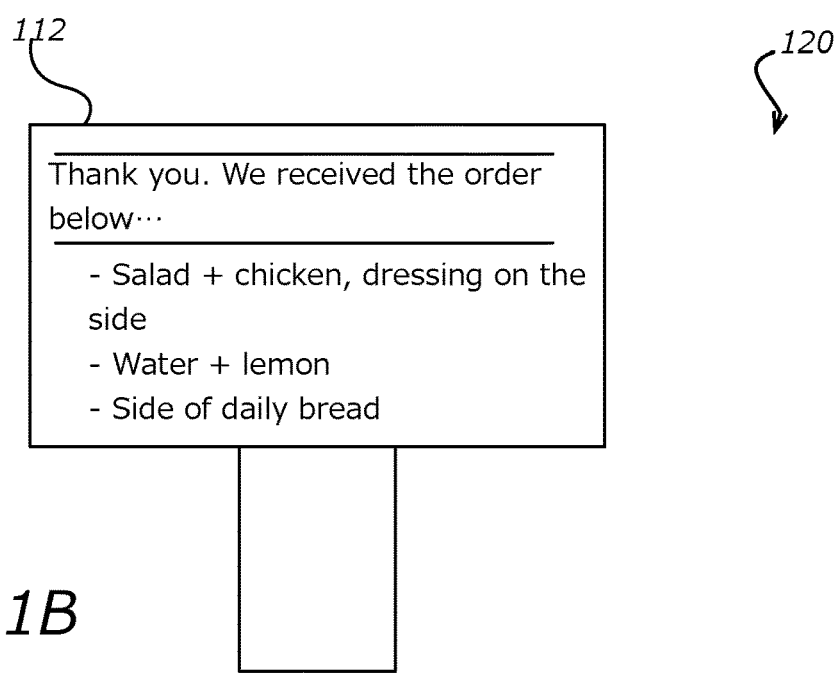

FIGS. 1A and 1B illustrate examples of a user interacting with a virtual assistant in accordance with embodiments herein. FIG. 1A illustrates a scenario 100 of a user attempting to order food at a drive-through window. In this example, the driver can pull into the drive-through lane of a fast-food restaurant. Through the driver's side window 102, the driver can review a menu 104 of food items. At a conventional drive-through establishment, a human operator can take the driver's order or in some embodiments, a virtual assistant may receive the order. In the situation a human operator receives the order, a person is employed and has to be present to receive the order. In this situation, however, it can be costly to hire, train, and determine scheduling of human operators.

In the situation a conventional virtual assistant is used to receive the order, the virtual assistant may receive the order as long as it can "understand" the request spoken by the user. For example, the driver can interact with voice-enabled ordering pole 106. Voice-enabled ordering pole 106 is a type of point-of-sale (POS) device. Voice-enabled ordering pole 106 can comprise microphone 108 for receiving voice requests from the driver, speaker 110 for providing synthesized voice responses to the driver's requests, and display 112 with text to show the driver's order. Voice-enabled ordering pole 106 can be in communication with a virtual assistant that is part of a virtual assistant interpretation service or system.

In an embodiment, the driver can initiate an order by speaking a trigger or wake phrase such as "I'm ready", "hi there", or "hello". The system can respond by soliciting the driver's order. The driver can then attempt to invoke one or more intents. In this example, intents can include an order intent, an add intent, a remove intent, an order status intent, a completion intent, etc. For example, the user's voice can comprise a sentence, and can include one or more spoken phrases that a user can speak to invoke the intent. An example of the sentence can include, e.g., "give me a burger", "I'll have a hamburger", "how many calories are in a shake", "is a shake healthy", "how much does all that cost", or "what's the total"?

Voice-enabled ordering pole 106 can send the voice audio through a request to a virtual assistant API. Upon receiving the voice audio, the virtual assistant system can transcribe the audio to text and search a list of sentences associated with intents. If the transcribed sentence does not match any sentence in the list, the virtual assistant provides an error response to the API request. This may include the virtual assistant requesting the user to repeat the order, which can be frustrating to the driver. In some conventional systems, device makers or content providers can create sentences or even keywords appropriate to each of potentially many types of requests that their APIs can handle to mitigate such errors. However, this can be expensive and burdensome to generate.

Accordingly, in accordance with various embodiments, a virtual assistant provider can greatly improve user access to the various functions available through an API by identifying keywords. One way that this can be done is by extracting keywords from the narrative descriptions of API functions and the meaning of arguments. Using those keywords, the virtual assistant system can use an NLG model to generate correct sentences for a virtual assistant to invoke the functions and arguments. The system can then automatically map, to the API or another type of corresponding function call, the correct sentences such that requests to the virtual assistant matching the generated sentences invoke a call of the function with the appropriate argument values in response to any related user request. For example, in the situation the virtual assistant does not understand the request, a virtual assistant interpretation service can attempt to interpret the requests according to the most likely intent by invoking a model (e.g., NLG model) fine-tuned for the virtual assistant, generate one or more sentences with a high probability of having the same intent, return those sentences as a response or output (e.g., a revised query), and fulfill the specific action defined by the intent using a one of the returned sentences (e.g., the sentence associated with the highest probability of having the same intent). The specific action can be, for example, sending a request to another API that collects fast food orders to dispatch to service windows. The virtual assistant can also provide an acknowledgment response, as shown in example 120 of FIG. 1B, which includes a description of the received order. When the request is for information, the virtual assistant can look up the information and respond accordingly.

Figure 2A:
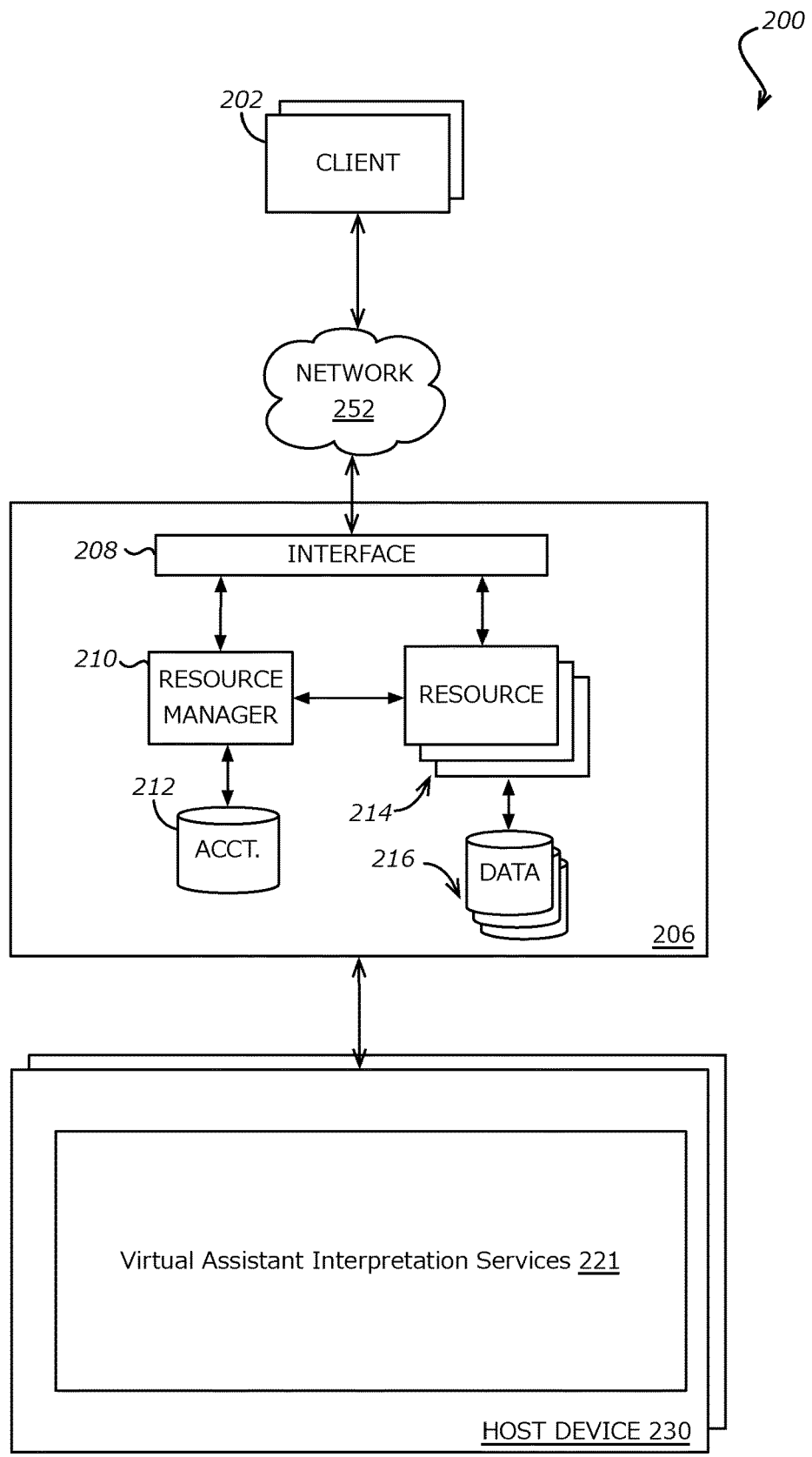
FIGS. 2A and 2B illustrate example environments in which aspects of the various embodiments can be utilized.

FIG. 2A illustrates an example environment 200 in which aspects of the various embodiments can be utilized. In this example, a user can utilize a client device 202 to communicate across at least one network 252 with resource provider environment 206. The client device 202 can include any appropriate electronic device operable to send and receive requests or other such information over an appropriate network and convey information back to a user of the device. Examples of such client devices 202 include personal computers, tablet computers, smartphones, notebook computers, and the like. The user can include a person authorized to manage the aspects of the resource provider environment. An example user can include a virtual assistant platform, client developers, content providers, etc.

The resource provider environment 206 can provide virtual assistant interpretation services 221 for virtual assistants that can support applications or domains (e.g., smart homes, e-commerce, travel, etc.) These services can, for example, train a model that can enable virtual assistants to respond to a broad range of requests addressed by different domains or may configure them to handle a specific set of requests from one or a small number of domains, such as restaurant domains. A virtual assistant can be a software agent with a voice-enabled user interface, which can perform tasks or services for a user based on his/her queries or spoken inputs. It can be integrated into different types of devices and platforms. For example, a virtual assistant can be incorporated into smart speakers, voice-enabled applications, and the like. In certain embodiments, the virtual assistant interpretation services 221 can be offered by a service provider to enable companies to easily create their own application-specific virtual assistants. In various embodiments, the virtual assistant interpretation services can be performed in hardware or software, or in combination thereof.

The network(s) 252 can include any appropriate network, including an intranet, the Internet, a cellular network, a local area network (LAN), or any other such network or combination, and communication over the network can be enabled via wired and/or wireless connections.

The resource provider environment 206 can include any appropriate components for enabling virtual assistant interpretation services that can support multiple applications or domains, each of which can be designed to respond to requests for a specific topic, e.g., a restaurant's order system, an automobile's voice control system. According to some embodiments, the plurality of domains can support one or more intents. An intent can represent actions that can fulfill a user's request that a user can invoke the virtual assistant to perform. Each intent can invoke a specific action, response, or functionality. For example, an intent can be a query of the current weather forecast, a command to turn on the lights, and an order to purchase an item. An intent can be either a built-in intent that has been predefined by developers or a customized or specific intent that needs to be specified by a developer. It should be noted that although the techniques described herein may be used for a wide variety of domains or applications, for clarity of presentation, examples relate to restaurant ordering systems. The techniques described herein, however, are not limited to restaurant ordering systems, and approaches may be applied to other domains where managing voice data is desirable.

The resource provider environment 206 might include Web servers and/or application servers for enabling virtual assistant interpretation services that can support multiple applications or domains. While this example is discussed with respect to the internet, web services, and internet-based technology, it should be understood that aspects of the various embodiments can be used with any appropriate services available or offered over a network in an electronic environment, or devices otherwise not connected or intermittently connected to the internet.

In various embodiments, resource provider environment 206 may include various types of resources 214 that can be used to facilitate virtual assistant interpretation services. In at least some embodiments, all or a portion of a given resource or set of resources might be allocated to a particular user or allocated for a particular task, for at least a determined period of time. The sharing of these resources from a provider environment is often referred to as resource sharing, Web services, or "cloud computing," among other such terms and depending upon the specific environment and/or implementation. Resources 214 can include, for example, application servers operable to process instructions provided by a user or database servers operable to process data stored in one or more data stores 216 in response to a user request.

In at least some embodiments, an application executing on the client device 202 that needs to access resources of resource provider environment 206, for example, to initiate an instance of virtual assistant interpretation services 221 can submit a request that is received to interface layer 208 of the resource provider environment 206. The interface layer 208 can include application programming interfaces (APIs) or other exposed interfaces, enabling a user to submit requests, such as Web service requests, to the resource provider environment 206. Interface layer 208 in this example can also include other components as well, such as at least one Web server, routing components, load balancers, and the like.

When a request to access a resource is received at the interface layer 208 in some embodiments, information for the request can be directed to resource manager 210 or other such systems, service, or component configured to manage user accounts and information, resource provisioning and usage, and other such aspects. Resource manager 210 can perform tasks such as communicating the request to a management component or other control component which can be used to manage one or more instances of the virtual assistant interpretation services 221 as well as other information for host machines 230, servers, or other such computing devices or assets in a network environment, authenticate an identity of the user submitting the request, as well as to determine whether that user has an existing account with the resource provider, where the account data may be stored in at least one data store 212 or 216 in the resource provider environment 206.

In an embodiment, the request can be used to instantiate virtual assistant interpretation services 221 on host device 230 and offer it as a web service through an application programming interface (API). In certain embodiments, a virtual assistant can be configured to enable client devices to send a user's spoken requests to APIs. In any situation, such an offering can be useful, for example, for a company to provide the service of interpreting and generating sentences to another company. For example, a provider of a service platform for implementing virtual assistants for various devices may allow a device developer to send sentences to an API and get back other sentences that are likely to have the same intent. In this example, the virtual assistant interpretation services 221 can configure an interaction model with the sample sentences selected by a classifier model so that the model can support the sample sentences to invoke an intent. An example of the interaction model can be a voice interaction model. According to some embodiments, a developer can configure the interaction model to define the logic for fulfilling a user request corresponding to an intent action, including, for example, the wake words, intents, sample utterances, placeholders, and actions. According to some embodiments, the developer can provide the keywords, examples, and domain identifiers to the interaction model.

In another example, a virtual assistant can be configured to enable client devices to send a user's spoken requests to APIs. In this example, the API can receive sentences as an API request or input, interpret the requests according to the most likely intent by invoking a model (e.g., NLG model) fine-tuned for a virtual assistant, generate one or more sentences with a high probability of having the same intent, and return those sentences as a response or output from the API. In certain embodiments, the request can be fulfilled with an answer or command action as described herein.

According to some embodiments, a keyword extraction model associated with the API can extract keywords from the input sentences as the input for the API.

It should be noted that although host machine 230 is shown outside the provider environment, in accordance with various embodiments, one or more components of virtual assistant interpretation services 221 can be included in resource provider environment 206, while in other embodiments, some of the components may be included in the provider environment. It should be further noted that host machine 230 can include or at least be in communication with other components, for example, content training and classification systems, image analysis systems, audio analysis systems, etc.

The system may also contain other subsystems and databases, which are not illustrated in FIG. 2A, but would be readily apparent to a person of ordinary skill in the art. For example, the system may include databases for storing data, storing features, storing outcomes (training sets), and storing models. Other databases and systems may be added or subtracted, as would be readily understood by a person of ordinary skill in the art, without departing from the scope of the invention.

Figure 2B:
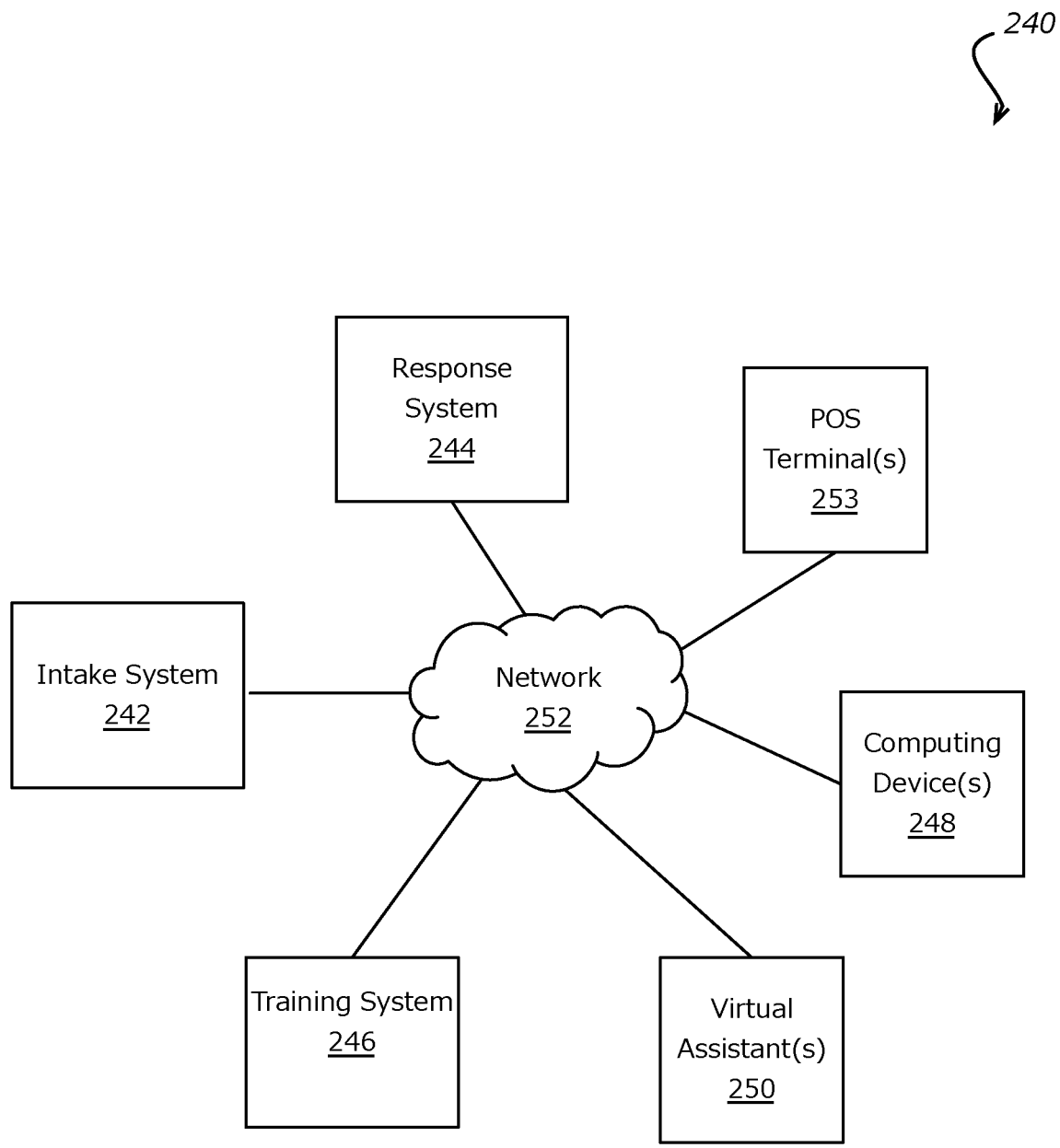

FIG. 2B illustrates an example system 240 in which aspects of the various embodiments can be utilized. It should be understood that reference numbers are carried over between figures for similar components for purposes of simplicity of explanation, but such usage should not be construed as a limitation on the various embodiments unless otherwise stated. In this example, system 240 comprises intake system 242, response system 244, training system 246, computing device(s) 248, virtual assistant(s) 250, point-of-sale (POS) terminal(s) 253, and network 252 over which the various systems communicate and interact.

Figure 3:
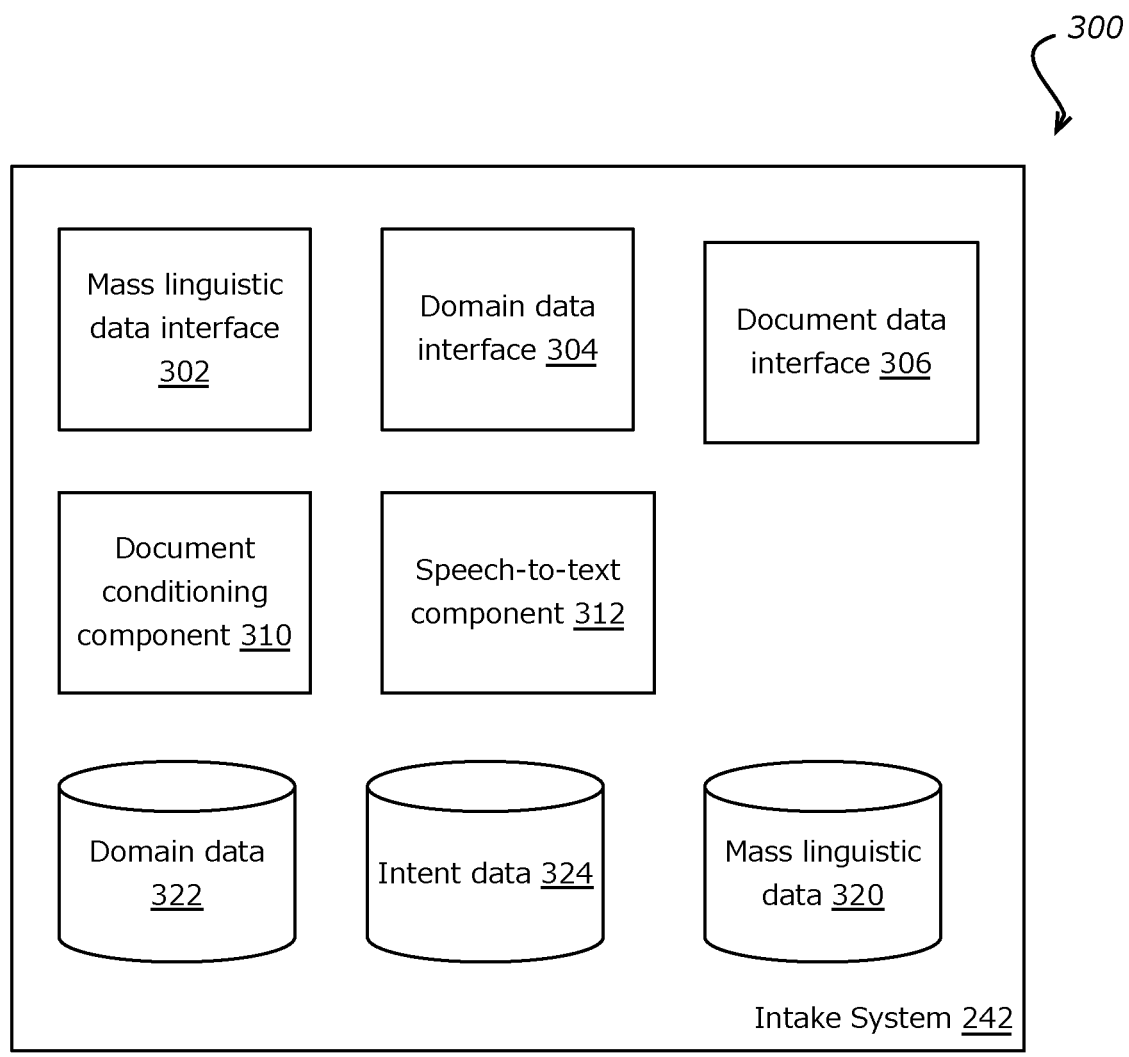
FIG. 3 illustrates an example intake system in accordance with various embodiments.

Intake system 242 is operable to obtain data shown in FIG. 3 such as mass linguistic data from mass linguistic data interface 302, domain data from domain data interface 304, document data from document data interface 306, and other text data. As described herein, obtain mass linguistic data, domain data, and document data can include queries and other text data. A query can comprise, for example, a sentence. In an example, the sentence can be "give me a burger". The sentence can be audio-based and/or text-based. Text data can comprise, for example, pairs of text data representing queries and responses. Document data can comprise restaurant menus, invoices, among other such documents described herein and known in the art. Receiving obtain mass linguistic data, domain data, and document data can include receiving images of such data. Intake system 242 will be discussed in more detail in reference to FIG. 3.

Response system 244 is operable to automatically generate potential sample phrases, utterances, or sentences that a user can say to invoke a set of defined actions, i.e., an intent, performed by a virtual assistant. For example, response system 244 can attempt to interpret the requests according to the most likely intent by invoking a sentence generation model (e.g., NLG model) fine-tuned for a particular domain or application (e.g., restaurant domain or application), generate one or more sentences with a high probability of having the same intent, return those sentences as a response, output, or revised query, and fulfill the specific action defined by the intent. Response system 244 will be discussed in more detail in reference to FIG. 4.

Training system 246 is operable to train neural network language models to generate such phrases, utterances, or sentences via unsupervised learning. In various embodiments, training system 246 is operable to train classifier models to compute correctness scores for sentences and select one or more sentences with correctness scores satisfying a threshold (e.g., higher than the threshold.) Training system 246 can receive training data from intake system 242.

In certain embodiments, training system 246 generates training data by converting query sentences to corresponding vector representations and then clustering these vector representations within vector space. The clusters generated by the clustering allow queries to be grouped and within each group one member to be selected as a revised query. This then produces, e.g., for each group, a set of queries that are paired with a revised query, e.g., for the group. The set of queries and the revised query for each group are then respectively used to generate source (real-world input) and target data samples (a preferred form) for the machine learning system, which allows the system to learn how to map ill-formed queries with more variation into more regularly formed queries that match commonly used requests.

In certain examples, obtaining the training data comprises obtaining pairs of text data representing queries and responses, and calculating vector representations of the query data samples comprises converting the pairs of text data to corresponding vector representations.

In text cases, training system 246 may further comprise performing named entity recognition on the text data and replacing the text data for tagged named entities with a named entity type tag. Performing named entity recognition and replacing surface token values (e.g., "cheese burger") with their corresponding general named entity type tag (e.g., <DISHES>) can help map multiple different query data samples, e.g. collected from different restaurants, to a common or shared representation that may facilitate the clustering.

In certain embodiments, a given vector representation comprises a response vector representation. A response vector representation can include a vector representation of the data representing the response to query. The response vector representation can be paired with data representing a corresponding query.

In an embodiment, clustering vector representations comprises clustering response vector representations based on distances (e.g., lowest vector distance, vector distance satisfying a threshold, etc.) between the response vector representations within vector space. A representative query can be determined for a given cluster within the clustered vector representations based on a frequency of the query data paired with response vector representations within the given cluster.

In one embodiment, calculating vector representations comprises: obtaining text representations of at least the responses to the queries; generating embedding vectors for the text representations; and projecting the embedding vectors to a lower dimensionality vector space to produce the vector representations. It has been found in tests that compressing the vector representations into lower dimensionality vector space leads to more efficient clustering and helps remove surface noise that can lead to poor quality clusters. In one case, generating embedding vectors for the text representations comprises: tokenizing the text representations and applying an encoder-decoder neural network such as a transformer neural network architecture to the tokenized text representations to generate the embedding vectors. Hence, an encoder neural network architecture similar to, or even a duplication of, the encoder portion of the encoder-decoder neural network architecture, can be used to generate a useful embedding at a sentence level that represents, e.g., queries and their responses.

In certain embodiments, generating paired data samples comprises filtering generated paired data samples. This may comprise one or more of: removing paired data samples with a representative query whose named entity tags do not match the named entity tags in the corresponding selection from the query group; and removing paired data samples based on a comparison of semantic distance metrics for the representative query and the corresponding selection from the query group.

In certain cases, the method further comprises optimizing one or more of the following metrics: one or more clustering distance thresholds; one or more cluster size thresholds; and one or more frequency thresholds for the selection of representative queries. These parameters may be optimized per domain, implementation and/or application. Optimizing for a particular use case may result in improved performance for that use case. Manual or automated optimization methods may be applied. Aspects of training system 246 will be discussed in more detail in reference to FIG. 5 and FIG. 6.

Virtual assistant(s) 250 includes a software agent with a voice-enabled user interface, which can perform tasks or services for a user based on his/her queries or spoken inputs. For example, virtual assistant(s) 250 can obtain a query (e.g., a natural language request) and can transmit the natural language requests across network 252 to an appropriately trained virtual assistant platform or server to perform the tasks or services through APIs.

Virtual assistant(s) 250 can be integrated into different types of devices and platforms. For example, a virtual assistant can be incorporated into POS terminal(s) 253, smart speakers, computing device(s) 248, robots, telephone or VoIP systems for receiving voice orders for restaurants, voice enabled applications for specific companies, and the like.

According to some embodiments, content providers can provide virtual assistant access via an API. Examples of such content providers can be restaurant ordering system providers, weather providers, recipe providers, sport score providers, and stock price providers. Upon requests from the client, the virtual assistant can invoke their API to, for example, retrieve information needed from the content provider and provide it to the client.

A virtual assistant can support multiple applications or domains, such as smart home, E-commerce, travel, etc., each of which can be designed to respond to requests for a specific topic, e.g., a restaurant's order system, an automobile's voice control system. As long as it can "understand" the request sentence spoken by the user, the virtual assistant can support queries that request information and commands that request an action. A virtual assistant for a single application could have as few as just one domain. In an example, a virtual assistant can support an intent for ordering a hamburger, which can be used for an order-taking application at a fast-food restaurant. After one or more intents are asserted with associated likelihood scores, the virtual assistant can determine a selected intent for the fulfillment, which can be any appropriate function or operations such as searching for specific information, performing a request, or sending a message to a device to cause it to perform an action.

POS terminal(s) 253 can include functionality to interpret the queries. For example, POS terminal(s) 253 can be associated with virtual assistant(s) 250. A POS terminal obtains natural language requests and can transmit the request across network 252 to intake system 242 and/or other appropriate systems. As described, this includes receiving queries (e.g., natural language requests) and having them interpreted in relation to sentences that correspond to many intents that virtual assistant(s) 250 is able to handle. In various embodiments, POS terminal(s) 253 may accept one or more payment methods from a purchaser.

The one or more payment methods may comprise credit card payment, debit card payment, payment from a digital wallet, cryptocurrency payment, gift card payment, etc. The one or more payment methods may comprise swiping a card, tapping a card, reading a card chip, transmission of a near-field communication (NFC) signal, transmission of a signal indicative of a digital wallet transaction, transmission of a signal indicative of a cryptocurrency transaction, manual entry of payment information, capturing an image on payment information, etc. POS terminal(s) 253 may capture payment information associated with an accepted payment method and transmit the captured payment information and associated transaction information across network 252 to a payment network processor and/or one or more banking institution(s).

Computing device(s) 248 may include, generally, a computer or computing device including functionality for communicating (e.g., remotely) over network 252. Data may be collected from computing device(s) 248, and data requests may be initiated from each computing device. For example, a computing device and/or a server accessed via computing device(s) 248 may transmit the query across network 252 to intake system 242 and/or one or more other systems. When the query is received, a virtual assistant interpretation service can attempt to interpret the requests according to the most likely intent by invoking a model (e.g., NLG model) fine-tuned for a virtual assistant, generate one or more sentences with a high probability of having the same intent, return those sentences as a response or output. It can then fulfill the specific action defined by the intent. Computing device(s) 248 may be a server, a desktop computer, a laptop computer, personal digital assistant (PDA), an in- or out-of-car navigation system, a smart phone or other cellular or mobile phone, or mobile gaming device, among other suitable computing devices. In particular embodiments, each computing device may be an electronic device including hardware, software, or embedded logic components or a combination of two or more such components and capable of carrying out the appropriate functions implemented or supported by the computing device(s) 248.

Network 252 generally represents a network or collection of networks (such as the Internet or a corporate intranet, or a combination of both) over which the various components illustrated in FIGS. 2A and 2B (including other components that may be necessary to execute the system described herein, as would be readily understood to a person of ordinary skill in the art). In particular embodiments, network 252 is an intranet, an extranet, a virtual private network (VPN), a local area network (LAN), a wireless LAN (WLAN), a wide area network (WAN), a metropolitan area network (MAN), a portion of the Internet, or another network 252 or a combination of two or more such networks 252. One or more links connect the systems and databases described herein to the network 252. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network 252, and any suitable link for connecting the various systems and databases described herein.

One or more data storages may be communicatively linked to one or more servers via one or more links. In particular embodiments, data storages may be used to store various types of information. In particular embodiments, the information stored in data storages may be organized according to specific data structures. In particular embodiments, each data storage may be a relational database. Particular embodiments may provide interfaces that enable servers or clients to manage, e.g., retrieve, modify, add, or delete, the information stored in data storage.

System 240 may also contain other subsystems and databases, which are not illustrated in FIG. 2B, but would be readily apparent to a person of ordinary skill in the art. For example, the system may include databases for storing data, storing features, storing outcomes (training sets), and storing models. Other databases and systems may be added or subtracted, as would be readily understood by a person of ordinary skill in the art, without departing from the scope of the invention.

FIG. 3 illustrates an example 300 of an intake system in accordance with various embodiments. In this example, intake system 242 may comprise or be in communication with mass linguistic data interface 302, domain data interface 304, document data interface 306, document conditioning component 310, speech-to-text component 312, mass linguistic data store 320, domain data store 322, and intent data store 324.

Mass linguistic data interface 302 obtains the mass linguistic data maintained in mass linguistic data store 320. Mass linguistic data can be used to train sentence generation model 408 and intent detection/classification model 410, among other such appropriate components. The mass linguistic data can include a large amount of general textual data. In an example, mass linguistic data can include books, newspaper articles, internet content from one or more websites. In certain embodiments, mass linguistic data can include foreign language data, (e.g., French, Spanish, and Chinese, are foreign languages to a general NLG model that was trained on English data).

Domain data interface 304 obtains domain and/or application specific data that is specific for a domain or an application and maintained in domain data store 322. The domain data can include typical request sentences given by users to a virtual assistant for a particular domain (e.g., restaurant domain), transcriptions of such requests, etc.

Document data interface 306 obtains document data. Document data can include, e.g., restaurant menus and other such data. When document data is received, the document data can be processed and stored into an appropriate database. For example, the document data can be stored in domain data store 322 or other appropriate data store. In an embodiment, document data can be stored in a format that can be consumed by one or more other components, such as document conditioning component 310. For example, this may include but is not limited to a flat file, non-relational or relational database, or any other readily available electronic medium.

As described herein, mass linguistic data interface 302, domain data interface 304, and document data interface 306 may include a data interface and service interface configured to periodically receive documents, requests, and/or any other relevant information to facilitate automatically generating sentences or phrases that a user can say to invoke an intent by a virtual assistant. In an example, a database server or other appropriate component is generally capable of providing an interface for managing data stored in one or more data stores. In an embodiment, mass linguistic data interface 302, domain data interface 304, and document data interface 306 can include any appropriate components known or used to receive requests or other data from across a network, such as may include one or more application programming interfaces (APIs) or other such interfaces for receiving such requests and/or data, including but not limited to, data scrapes, API access, etc. In a specific example, document data interface 306 communicates with computing device(s) 248, mass linguistic data store 320, domain data store 322, or other repositories or devices to obtain and store document data.

As described, document data can include restaurant menus. Processing restaurant menus can include recognizing user orders and intents. In certain embodiments, restaurant menus can be "conditioned", which allows for describing food items in ways that are not represented in a restaurant menu. In an embodiment, menu conditioning generates synonyms for menu items or their descriptions, which enables identifying menu items to perform placeholder replacement in real-time.

In one example, to describe food items in ways that are represented in a restaurant menu, document conditioning component 310 can train on sentences with placeholders for a certain type of word, optional and alternative words, and/or utilize weights to indicate commonness of optional and alternative words. In an example, a large general-purpose language model can be fine-tuned to be able to predict sentences that may have placeholders for a certain type of word and optional and alternative words. For example, for an item named "BLT sandwich", there are multiple ways of saying this, "BLT sandwich", "BLT", "bacon lettuce and tomato sandwich", etc. Document conditioning component 310 can be utilized to generate sentences representing ways of saying "BLT sandwich", and those which match what the user said, can be mapped to the item "BLT sandwich". Thereafter, the items/synonyms generated from menu conditioning can be combined with the per-client menu and used in real time for tagging.

In a specific example, a placeholder for a certain type of word and/or optional and alternative words in the sentence can be identified. This can include, for example, performing named entity recognition on one or more sentences. This may be performed by applying one or more functions from available machine learning processing libraries such as the spaCy library managed by ExplosionAI GmbH or the Stanford Named Entity Recognizer provided by Stanford University. Named entity recognition is a known parsing function that may be applied to unstructured text data to locate tokens (e.g., characters, words or groups of words) within the text data that relate to entities (e.g., menu items, ingredients, etc.) or things with consistent referents, such as people, places and times.

A sentence embedding model can be used to embed the placeholder and compare sentence similarity against a list of available words to find a closest match. Embedding the placeholder can comprise replacing placeholder with a named entity type tag, such as respectively replacing the placeholder with a list of available menu items. In an example, following named entity parsing a sentence may comprise [I want a<"bacon lettuce tomato sandwich">], where "bacon lettuce tomato sandwich" is identified as a placeholder, and other possible ways of saying "bacon lettuce tomato sandwich" can be embedded. For example, "BLT sandwich" is inserted in place of "bacon lettuce tomato sandwich", i.e., an order intent matches the menu item for a rewritten sentence ["I want a BLT sandwich"]. The list of available words may comprise entities present in a menu, including, for example, the names of dishes offered in the menu. Other entities in meus can include optional ingredients or optional aspects of a dish to be prepared. In various embodiments, the list of words is associated with a domain identifier such as a text label or some other unique code that can identify the list of words. In another example, to describe food items in ways that are represented in a restaurant menu, document conditioning component 310 can generate a list of synonyms representing ways of saying "BLT sandwich."

Speech-to-text component 312 is operable to receive audio data and translate the audio data into a text data output. For example, the speech-to-text component 312 may comprise an automated transcription system that is based on one or more of hidden Markov models and neural network architectures (e.g., convolutional and recurrent neural network encoders). In this example, the speech-to-text component 312 provides a text data output for intake system 242, response system 244, and other appropriate systems and/or components.

Intent data store 324 comprises one or more intents. An intent can be one that invokes one or more defined actions to be performed by a virtual assistant. As a data structure, an intent is a description of the action to be performed. For example, an intent can be specified in a data structure represented in a format such as a JSON schema.

According to some embodiments, an intent can comprise placeholders, such as arguments, for collecting variable values to complete the described action or operation.

To invoke an intent, a user can say one or more sentences that are supported by the virtual assistant. These sentences include a list of defined phrases or words that invoke an intent. The sentence can comprise one or more spoken phrases that a user can speak to invoke the specific intent. Each intent can be mapped to a number of sentences, all of which need to be provided to the virtual assistant so that it can understand the user's query or command. For example, the sentences "add a cheese burger" and "grab me a soda" are all different ways for a user to express essentially the same intent, which is a query request for adding two menu items to an order.

Figure 4:
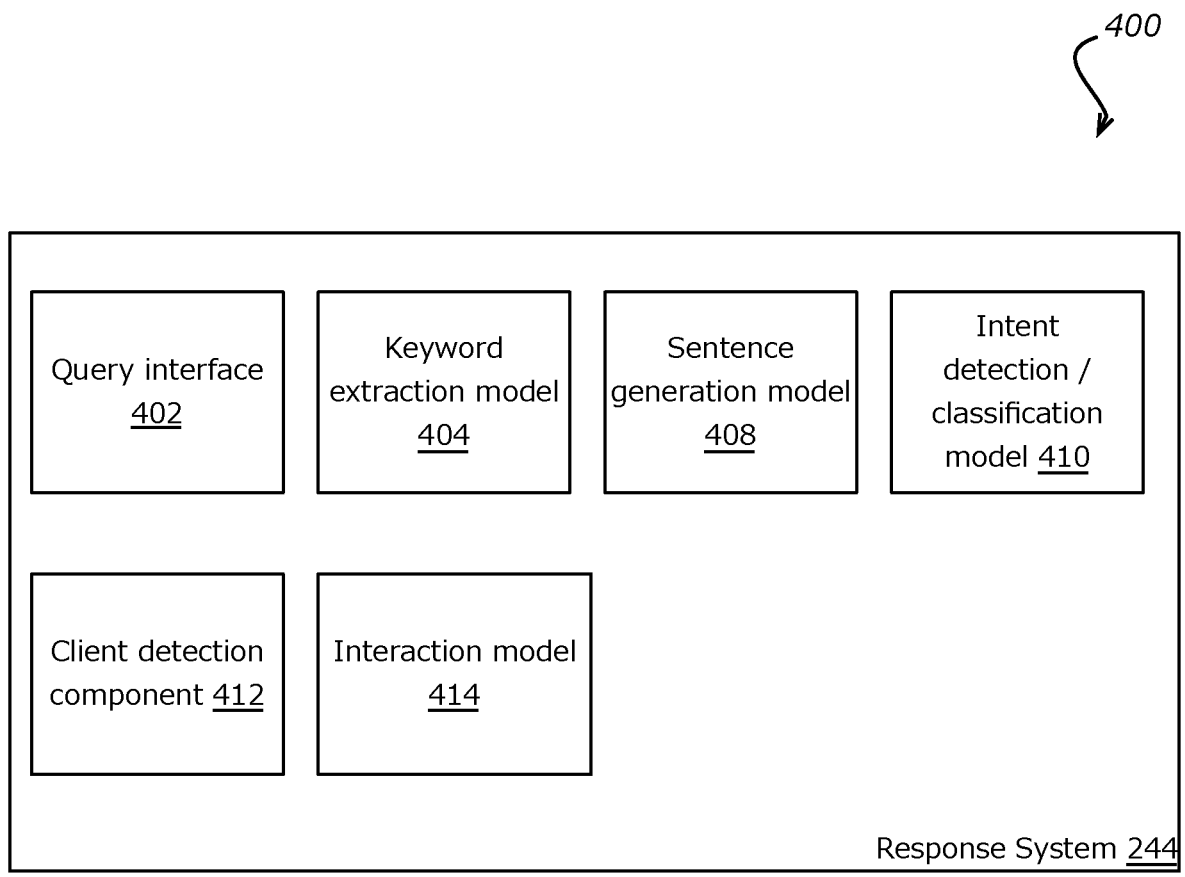
FIG. 4 illustrates an example response system in accordance with various embodiments.

FIG. 4 illustrates an example 400 of a response system in accordance with various embodiments. In this example, response system 244 comprises query interface 402, keyword extraction model 404, sentence generation model 408, intent detection/classification model 410, client detection component 412, and interaction model 414.

Query interface 402 allows a user to query a virtual assistant or other appropriate system and/or component. In certain examples, the query interface may comprise a voice query interface. For example, a user may speak to a voice-enabled ordering pole 106, motor vehicle, or a home assistant. The user's utterances may comprise a voice query, such as a request for information or a request to implement a particular command. In other examples, the query interface may comprise a text interface, such as a messaging application on a personal computing device. In this case, the user may enter text via an onscreen keyboard or another user input device. In both cases, the query may be represented in the form of text data by the client devices, e.g. either as entered directed or via a speech-to-text system. In cases where a client device comprises a voice-controlled device, it may further comprise one or more microphones and an audio pre-processor.

Keyword extraction model 404 is operable to extract keywords to represent an intent (e.g., customized or specific intent). Keyword extraction model 404 can parse a sentence based on a keyword extraction model. Such a model can learn from linguistic grammar rules and tag words by their part of speech, such as articles, adjectives, nouns, prepositions, adverbs, and verbs. Some parts of speech tend to be more relevant to distinguishing the intent of a sentence. It can also be helpful to tokenize sentences to identify phrases that act as a part of speech. For example, "New York" is a phrase made of two words that, in most uses, can act as a single noun phrase.

According to some embodiments, the keyword extraction model, such as Spacy, can tokenize and tag the part-of-speech of words in sentences. One approach to extracting keywords is to use the nouns, verbs, adjectives, and adverbs from sentences as the keywords to combine with sentences for training. This process of extracting certain parts-of-speech as keywords and prepending them to each transcript, along with the domain, is not very computationally intensive.

According to some embodiments, in addition to part-of-speech-based selection of keywords, the keyword extraction model can select the most important words from sentences. One example of an algorithm for determining word importance is a term frequency-inverse document frequency (TF-IDF) model built from a corpus of general linguistic text or from the text or transcriptions specifically received by a virtual assistant.

Sentence generation model 408 can produce correct and meaningful sentences for the intent based on the provided keywords. According to some embodiments, the sentence generation model can be a general-purpose natural language generation (NLG) model that is fine-tuned by associated keywords combined with corresponding sentences. According to some embodiments, the natural language generation model can be fine-tuned by domain identifiers. Finetuning is the procedure of training a general language model using customized or specific data. As a result of the finetuning procedure, the weights of the original model can be updated to account for the characteristics of the domain data and the task the system is interested in.

According to some embodiments, a general-purpose pre-trained natural language generation (NLG) model can be a transformer-based language models. Examples of such language models can be a BART model, which is a denoising autoencoder for pretraining sequence-to-sequence models. A BART model is a transformer-based model that combines the bidirectional encoder, such as Bidirectional Encoder Representations from Transformers (BERT), with an autoregressive, left-to-right decoder, such as Generative Pretrained Transformer 3 (GPT-3), into one sequence-to-sequence language model. Other examples of the language models can be BERT, GPT-2 or other pre-trained language models for generating sentences.

Intent detection/classification model 410 can comprise a classifier model and can be utilized to remove incorrect sentences. For example, a trained classifier model can calculate the probability (e.g., a correctness score) that a generated sentence invokes a user's intent. The correctness scores can vary between different sentences associated with an intent.

The classifier model can be trained on positive datasets, negative datasets, and/or unlabeled datasets to predict how likely it is that a generated sentence invokes a user's intent. According to some embodiments, intent detection/classification model 410 can map the plurality of preliminary received sentences to supported sentences regarding a specific intent (e.g., a user's intended intent), wherein the supported sentences are known to invoke the user's intent.

Client detection component 412 is operable to identify a domain identifier, such as a text label or some other unique code, that can be combined with the training sentences. For example, the name of a domain may be prepended to keywords prepended to training sentences. As such, the resulting fine-tuned model can generate domain-specific output sentences. For example, a model trained on sentences with a weather domain identifier and a fast-food ordering identifier will tend to generate sentences with phrases like "will it" and "is there a chance" in response to input of a weather domain identifier and sentences with phrases like "give me" and "I'll have a" in response to input of a fast-food domain identifier.

According to some embodiments, multi-domain virtual assistants, such as general-purpose voice virtual assistants, can also realize the benefits of using domain identifiers or tags. Interpretation of user requests within the wrong domain is a major cause of poor user experience in multi-domain virtual assistants. Training to generate sentences based on a domain tag significantly improves domain selection, user experience, and the market success of products.

Interaction model 414 is configured for a virtual assistant with sentences in such a way that the model can support the selected sentences to invoke an intent (e.g., customized or specific) intent. An example of interaction model 414 can be a voice interaction model capable of handling a user's query by understanding the selected sentences. According to some embodiments, interaction model 414 can be a text interaction model capable of handling textual exchanges between a user and a virtual assistant. According to some embodiments, the voice interaction model can incorporate and process information such as wake words, utterances, invocation names, intents, and placeholders, all of which are used to understand a user's spoken query. When the user interface is textual, a text interaction model can interpret the sample sentences and determine the corresponding responses or actions with a user via text exchanges.

Figure 5:
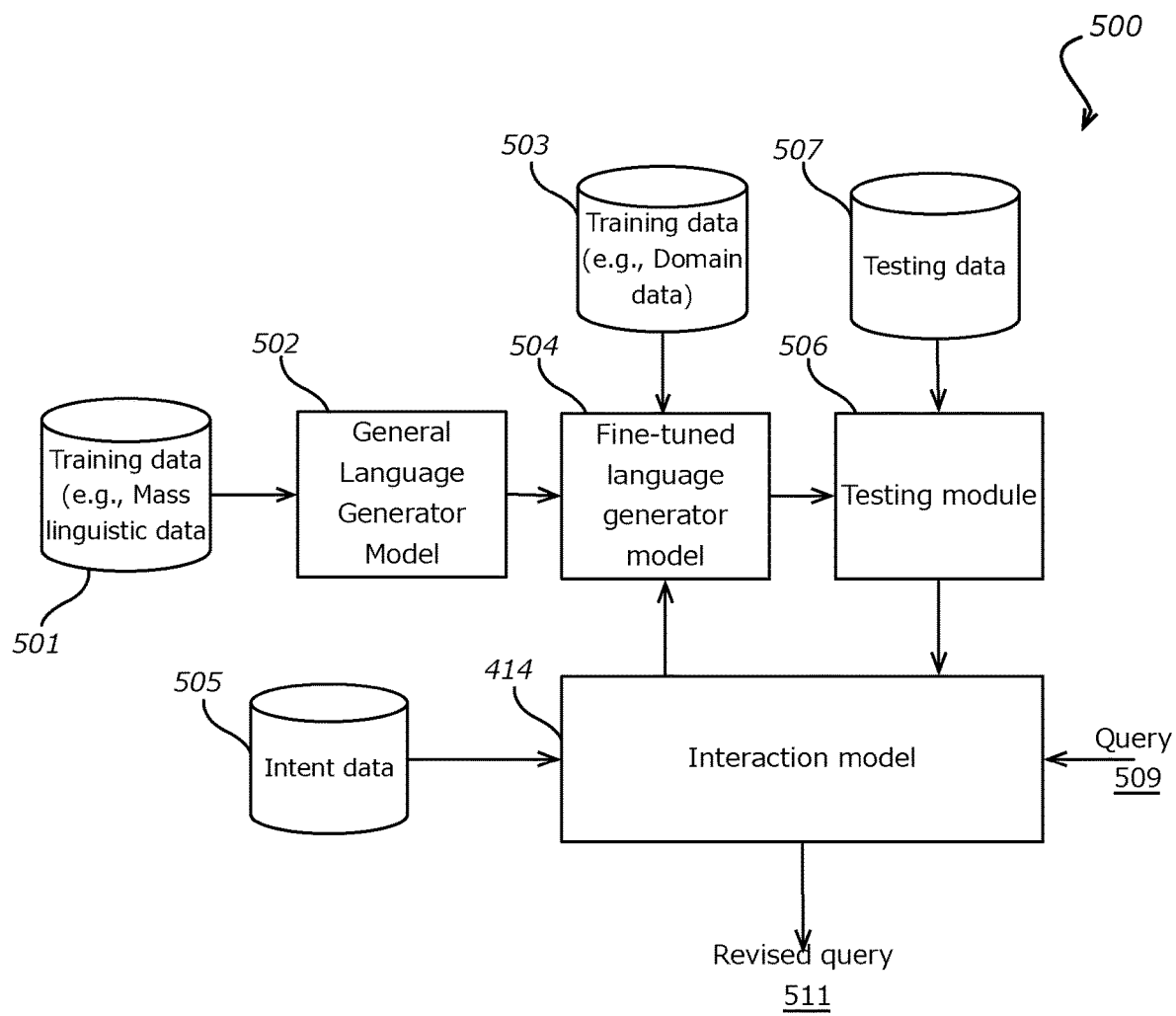
FIG. 5 illustrates an example system for generating sentences to associate with an intent in accordance with various embodiments.

FIG. 5 illustrates an example system 500 for generating sentences to associate with an intent in accordance with various embodiments. In this example, system 500 includes general-purpose NLG model 502, fine-tuned language generator model 504, testing module 506, and interaction model 414. As described, since an intent should be invoked by many possible sentences, it is traditionally a labor-intensive process to manually create, write and evaluate many sample sentences for an intent. Even though generating augmented semantic grammars is more efficient, it nonetheless can require a high level of training and expertise and lots of human time. As such, with either approach, it remains difficult to create a full list of possible spoken phrases a user can say to invoke an intent.

Instead of creating these unlimited sentences by experienced developers, the present subject matter can employ neural network models and machine learning to automate the generation of numerous, thorough, and effective sentences to invoke one intent. Generated by fine-tuned natural language generators and trained classifier models, these sentences can have a semantic meaning to invoke the specific intent they were created for.

As shown in FIG. 5, the neural sentence generator system can start with a general-purpose Natural Language Generator (NLG) model 502. A general-purpose NLG model 502 can be trained with a large amount of general textual data, such as training data 501 (e.g., mass linguistic data maintained in data store 320), so that it can learn the grammatical structures and semantics of a language, which can be used to predict the next word or phrase after a sequence of words or a missing word in a sentence. As such, based on the learned language patterns, the general-purpose NLG model 502 can also generate a complete sentence based on a few keywords. While various general-purpose language models could be adopted, an example can be a neural-network language model called a transformer.

Some transformers that are known for their use in human language translation can also be used to generate natural language sentences. The Generative Pretrained Transformer 2 (GPT-2) is an example of a general-purpose NLG model trained on massive amounts of linguistic data by the OpenAI organization using a large amount of data and computing power. It is available to other companies and organizations as a conditional natural language model. GPT-2 was trained from a WebText corpus of web pages. Hugging Face, for example, offers a Transformer Python package library of pre-trained Transformer-based models. GPT-2 is one such model that can be useful as a general NLG model from which to finetune models for specific purposes such as virtual assistants.

In addition, NLG models can be trained from other linguistic data sources to achieve different linguistic results. For example, an NLG model trained from articles from main stream newspapers would produce much more formal sentences than an NLG model trained from short social media messages, which tend to have much simpler sentences that follow more lax grammar rules.

A general-purpose NLG model can contain, within its parameters, knowledge of how people use language in general. Some NLG models are specific to one or another human language, such as English, Chinese, Japanese, German, Korean, or French. Some NLG models are generalized to all human languages. They merely represent ways that humans express ideas and can be fine-tuned to work for individual human languages.

As shown in FIG. 5, the general-purpose NLG model 502 can be fine-tuned with training data 503 (e.g., domain data maintained in data store 322), or mass linguistic data that is specific for a domain or an application. Because the general pattern of a language can be different from the specific language used in a particular domain or application, the general-purpose NLG model 502 can be fine-tuned for its own domain and target purpose, such as a restaurant domain, or a specific restaurant.

According to some embodiments, finetuning a language model can be the process of updating parameters of a general-purpose language model to improve accuracy with domain-specific data. The finetuning process can, for example, adjust the weights of the general-purpose NLG model 502 so that the fine-tuned model 504 can account for the characteristics of the domain-specific data and target purpose.

According to some embodiments, finetuning a general-purpose, pre-trained NLG model, such as general-purpose NLG model 502, can save development time and allow more accurate results from smaller training datasets. It can further enable a provider of the pre-trained, general model to serve many customers developing products in different industries and applications.

According to some embodiments, finetuning can be achieved by transfer learning, in which the new model can use training data specific to its purpose or application. As shown in FIG. 5, general-purpose NLG model 502 can be fine-tuned with training data 503. In an example, training data 503 can include typical request sentences given by users to a virtual assistant for a particular domain (e.g., restaurant domain). By learning the specific grammatical structures and words of such typical request sentences, the fine-tuned NLG model 504 can produce the types of sentences that virtual assistants are likely to receive from users. For a voice-enabled virtual assistant, the training data can be transcriptions of requests. For a text-based virtual assistant, the sentences can be text. For a general-purpose virtual assistant, it can use a broad range of sentences. To finetune for an application-specific virtual assistant, it can be trained by sentences specific to such an application or domain. By doing so, the system would learn the type of phrasings that are used in a particular domain or application.

According to some embodiments, the fine-tuned NLG model 504 can be unidirectional or bidirectional. A unidirectional model can only read the input from one side to another, while a bidirectional model can read the input from both sides, left-to-right, and right-to-left. For example, the GPT-3 models are unidirectional. Such models can generate sequences of words where each word depends on the previous words in a natural human sentence. Those models can be referred to as left-to-right generators, though they would generate sentences with words in the order written right-to-left if trained for right-to-left written languages such as Hebrew and Arabic. For example, the BERT model is bidirectional, which can work bidirectionally, looking at words to the left and right when predicting words to insert within a sentence.

According to some embodiments, a fine-tuned NLG model trained by keywords and corresponding sentences can produce correct and meaningful sentences for the intent based on the provided keywords. According to some embodiments, a developer can specify such keywords to define a new intent or enhance the set of sentences that correctly invoke an existing intent. Because the fine-tuned NLG model learned from a general-purpose NLG model, it can generate correct sentences even if the training never included examples of the keywords for a given intent. Furthermore, some generated sentences that are correct might include none of the keywords used to prime the generation. For example, a fine-tuned NLG, if given the keywords "hamburger", "cheese", and "fries", might generate the sentence "I would like a hamburger with cheese and a side of fries". Such generation is because the general-purpose NLG contains knowledge that the word "hamburger" is related to the words "cheese" and "fries".

According to some embodiments, a unidirectional sentence generator, such as GPT-3, can be fine-tuned on sentences that begin with a set of keywords combined with corresponding sentences. The combining can be achieved by simple concatenation of the keywords before the sentence. For example, an entry in the finetuning training data 503 could be "<KEYWORDS> cheese burger ketchup soda <SENTENCE> add a cheese burger with ketchup with a side of fries". A model fine-tuned on that, and other examples with a similar pattern can learn to infer how to generate correct sentences from keywords. As a result, with a set of provided keywords, the fine-tuned model can generate meaningful sentences. For example, providing the input "<KEYWORDS> like BLT <SENTENCE>", the model might generate sentences such as "I would like a bacon lettuce and tomato sandwich" and "add BLT sandwich", etc.

According to some embodiments, the performance of a multi-domain virtual assistant can be further improved with a domain identifier, such as a text label or some other unique code, being combined with the training sentences. For example, the name of a domain may be prepended to keywords prepended to training sentences. As such, the resulting fine-tuned model can generate domain-specific output sentences. For example, a model trained on sentences with a weather domain identifier and a fast-food ordering identifier will tend to generate sentences with phrases like "will it" and "is there a chance" in response to input of a weather domain identifier and sentences with phrases like "give me" and "I'll have a" in response to input of a fast-food domain identifier.

According to some embodiments, multi-domain virtual assistants, such as general-purpose voice virtual assistants, can also realize the benefits of using domain identifiers or tags. Interpretation of user requests within the wrong domain is a major cause of poor user experience in multi-domain virtual assistants. Training to generate sentences based on a domain tag significantly improves domain selection, user experience, and the market success of products.

Examples discussed above combine keywords with correct sentences by concatenation and specifically prepending keywords to sentences. Another way of combining keywords and sentences for finetuning and generation is by placing the keywords within sentences and using a bidirectional model such as BART. Accordingly, generation would work by inputting keywords, potentially multiple times in different order, and allowing the model to hypothesize whether another word would come between them and, if so, what the word might be. The bidirectional model would repeat that process with a given intermediate sentence until it hypothesizes that no more words would come between other words in the sentence.

As shown in FIG. 5, based on either manually or automatically generated keywords, the fine-tuned NLG model 504 can generate a large number of preliminary sentences that can be further filtered or vetted by testing module 506. Even a carefully fine-tuned NLG model based on a well-trained general-purpose NLG model can generate some sentences that do not make sense for a user. For example, based on weather keywords such as "weather," "rain," "day," the fine-tuned NLG model 504 can generate preliminary sentences such as "will it rain yesterday". This sentence is grammatically correct in English, and "yesterday" is a day. However, it is very unlikely that a virtual assistant user would make such a request since "will it rain" is usually followed by a word that refers to the future, and the word "yesterday" refers to the past.

According to some embodiments, testing module 506 can be utilized to remove such incorrect sentences. In an embodiment, testing module 506 comprises a classifier model. The classifier model can be trained on testing data 507 that comprises positive datasets, negative datasets, and unlabeled datasets to predict how likely it is that a generated sentence is correct for a user. As shown in FIG. 5, a fine-tuned NLG model 504 is fine-tuned using training data 503 from a general-purpose NLG model 502, which was pre-trained on training data 501. The fine-tuned NLG model 504 can generate a large number of preliminary sentences from keywords. A trained classifier model can calculate the probability that a generated sentence invokes a user's intent. The probability is a correctness score for the preliminary sentence.

According to some embodiments, testing module 506 can further map the plurality of preliminary sentences to supported sentences regarding a specific intent, wherein the supported sentences are known to invoke the specific intent. According to some embodiments, the supported sentences can be lists of known, frequently used query sentences that have been collected and verified. According to some embodiments, the supported sentences can comprise augmented semantic grammars that are manually created to summarize a large group of similar queries related to one intent. For example, the augmented semantic grammars can comprise placeholders for variable words or phrases to reflect the specific query. As the classifier model can be trained on the supported sentences to associate them with a specific intent, it can determine and select sample sentences with a high probability, e.g., a score, for being associated with the specific intent.

According to some embodiments, the scores can be compared to a threshold, which can be empirically predetermined or dynamically adapted. For example, when the score exceeds the threshold, the system can associate query 509 comprising a sentence with intent 505 (also referred to as customized or specific intent) as a sample sentence. An example of intent 505 can be one that invokes one or more defined actions to be performed by the virtual assistant. When the score is lower than the threshold, the preliminary sentence can be discarded as being incorrect. As such, only sentences (e.g., revised query 511) with a sufficient likelihood can become sample sentences to be associated with the intent 505. Such elimination and selection can provide the benefits of supporting a large number of user expressions with little human effort while avoiding the false-positive triggering of the intent for incorrectly generated sentences.

According to some embodiments, the system can train testing module 506 to predict the probability of a generated sentence being correct by finetuning from a pre-trained NLG model such as a transformer. Various transformer models such as XLNET, BART, BERT, or ROBERTA, and their distilled versions can provide sufficient accuracy and acceptable training and inference-time performance for different datasets and applications.

According to some embodiments, the testing datasets 507 for testing module 506 can comprise both positive datasets and negative datasets of training data 503. The positive datasets can comprise supported sentences that have invoked the specific intent from the virtual assistant, and the negative datasets can comprise sentences that have failed to invoke the specific intent. In addition, unlabeled datasets such as random sentences can also be used for the training.

According to some embodiments, the training datasets for testing module 506 can comprise foreign language data, e.g., French, Spanish, and Chinese, etc. Training with a foreign language can improve the effectiveness of testing module 506 in selecting sample sentences in different languages. Similarly, the general-purpose NLG can be trained with the specific foreign language data that it is working with.

According to some embodiments, in addition to or instead of using the classifier model correctness score, the system can further consider a typical correctness score generated by the fine-tuned NLG model 504. According to some embodiments, a classifier model for a general virtual assistant can be trained to estimate the likelihood of a sentence being correct for any domain or application. According to some embodiments, a domain-specific classifier model can be trained to estimate the likelihood of a sentence being correct for a specific domain. According to some embodiments, an intent-specific classifier model can be trained to estimate the likelihood of a sentence being correct for a specific intent.

As shown in FIG. 5, the system can configure interaction model 414 of the virtual assistant with the sample sentences selected in such a way that the model can support the sample sentences to invoke intent 505. An example of interaction model 414 can be a voice interaction model capable of handling a user's spoken query (e.g., query 509) by understanding the sample sentences. According to some embodiments, interaction model 414 can be a text interaction model capable of handling textual exchanges between a user and a virtual assistant.

According to some embodiments, the interaction model 414 can be created to implement the logic for implementing responses (e.g., response 511) and actions of the virtual assistant in response to an intent. It can provide a platform interface, e.g., a voice interface, between the user and the virtual assistant. To define the interface, a specific intent can be mapped to a list of the sample sentences.

According to some embodiments, to understand a user's spoken query, the interaction model 414 can incorporate and process information such as wake words, utterances, invocation names, intents, and placeholders. According to some embodiments, the interaction model 414 can interpret the sample sentences and determine the corresponding defined responses or actions corresponding to intent 505.

Figure 6:
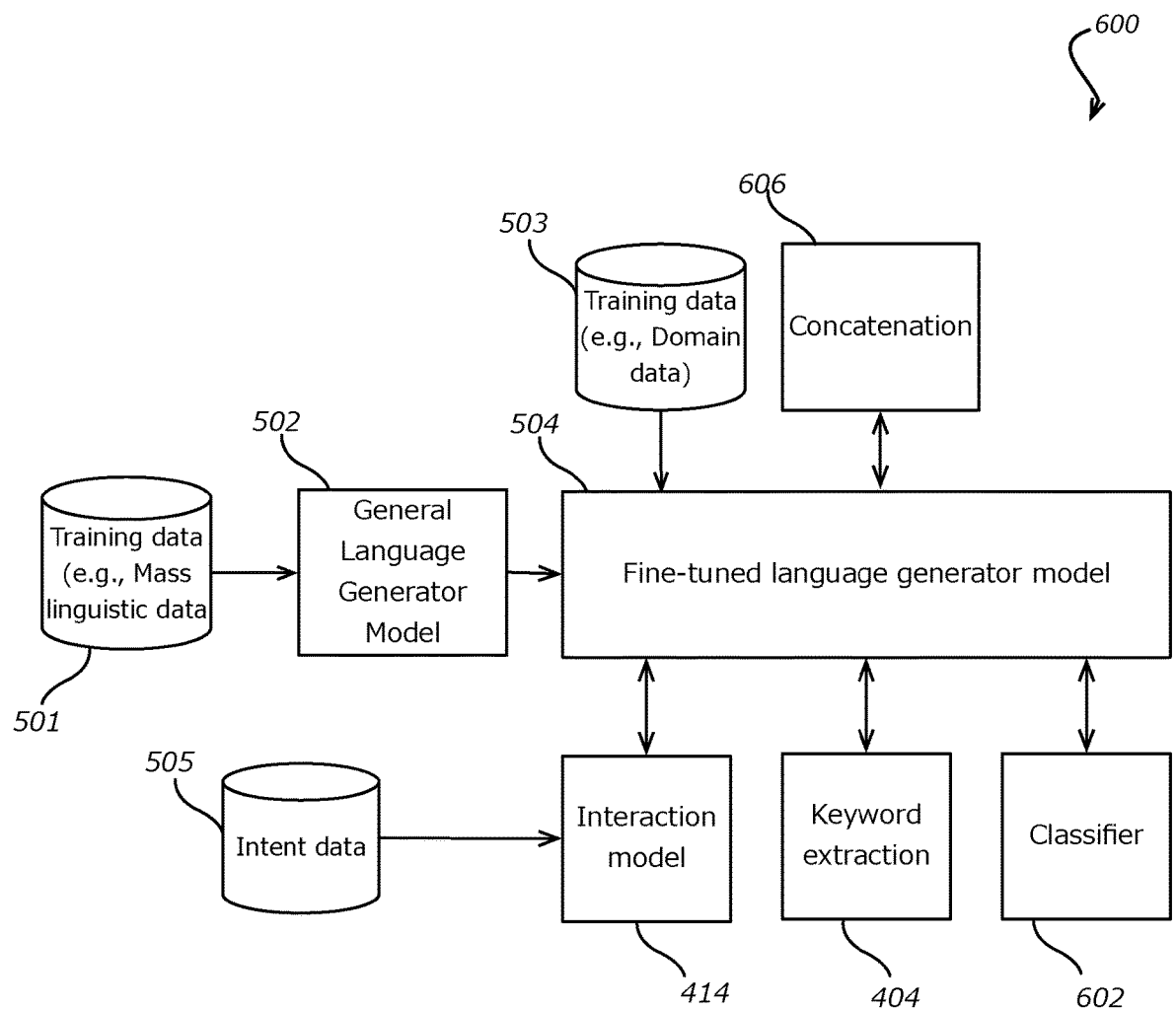
FIG. 6 illustrates an example system for finetuning a sentence generation model in accordance with various embodiments.

FIG. 6 illustrates an example system for iteratively generating sentences to associate with an intent and finetuning a sentence generation model in accordance with various embodiments. In this example, system 600 includes general-purpose NLG model 502, fine-tuned language generator model 504, interaction model 414, keyword extraction model 404, classifier 602, and concatenation or nullify component 606.

According to some embodiments, instead of the keyword-based sentence generation, the system can generate the sample sentences using existing, supported sentences. For example, the fine-tuned NLG model 504 and concatenation component 606 can use supported sentences or concatenate multiple sentences as inputs and generate sample sentences as outputs. According to some embodiments, the fine-tuned NLG model 504 can automatically extract domain identifiers and keywords for generating sample sentences. According to some embodiments, the domain identifiers and keyword extraction process can be completed offline in batches in order to prepare the training data, which can reduce the delay caused by keyword extraction in real-time.

According to some embodiments, to extract keywords to represent an intent (e.g., customized or specific intent), the system can parse a sentence based on a keyword extraction model (e.g., keyword extraction model 404). Such a model can learn from linguistic grammar rules and tag words by their part of speech, such as articles, adjectives, nouns, prepositions, adverbs, and verbs. Some parts of speech tend to be more relevant to distinguishing the intent of a sentence. It can also be helpful to tokenize sentences to identify phrases that act as a part of speech. For example, "New York" is a phrase made of two words that, in most uses, can act as a single noun phrase.

According to some embodiments, the system can add synonyms from a thesaurus as keywords. This can help the fine-tuned NLG model generate likely correct sentences that it might not have otherwise recognized.

According to some embodiments, the system can replace one or more extracted keywords with a placeholder that can represent a specific type of word.

According to some embodiments, to support general requests, the system can train on sentences with placeholders for a certain type of word such as a place name, product, or number. For example, training sentences might include the keywords "weather", "rain", and "<PLACE>" along with training sentences such as "what's the weather in <PLACE>" or "will it rain in <PLACE>". Other training sentences might include "<NUMBER><NUMBER>" along with the sentences "what's<NUMBER> plus <NUMBER>". When an NLG model fine-tuned with placeholder sentences is used to generate sentences, and when given keywords are provided with such placeholders, it can generate sentences with corresponding placeholders. Such sentences can be used to match user request sentences with any words or phrases at the location of the placeholder as long as the words or phrases are identifiable as a type that is appropriate for the placeholder type.

With such sentence-to-sentence generation, the system can execute the fine-tuned NLG model 504 in a loop to generate additional sample sentences and expand the set of correct sentences associated with an intent, as long as they have a sufficiently high likelihood of being correct for a virtual assistant according to the classifier scores. As shown in FIG. 6, the fine-tuned NLG model 504 can generate preliminary sentences from keywords extracted from supported sentences.

Classifier 602 can compute correctness scores for preliminary sentences. Sentences with a correctness score above a correctness threshold can be selected to be associated with intent 505. The plurality of preliminary sentences can be mapped to supported sentences regarding a specific intent, wherein the supported sentences are known to invoke the intent. According to some embodiments, the supported sentences can be lists of known, frequently used query sentences that have been collected and verified. According to some embodiments, the supported sentences can comprise augmented semantic grammars that are manually created to summarize a large group of similar queries related to one intent.

Sentences with correctness scores above a separate predetermined iteration threshold can be selected. A keyword extraction model 404 can extract keywords from the high-scoring sentences meeting the iteration threshold. Keywords and/or domain identifiers manually associated with the intent or automatically extracted keywords can be used to generate additional sample sentences. Next, the generated combined sample sentences can be further scored by classifier 602 to choose the highest-scoring ones as the sample sentences for a specific intent.

As shown in FIG. 6, the system can configure an interaction model 414 with the selected sample sentences in such a way that the model can support the sample sentences to invoke intent 505. An example of the interaction model 414 can be a voice interaction model capable of handling a user's spoken query by understanding the sample sentences. According to some embodiments, interaction model 414 can be a text interaction model capable of handling textual exchanges between a user and a virtual assistant.

According to some embodiments, the interaction model 414 can incorporate and process information such as wake words, utterances, invocation names, intents, and placeholders, all of which are used to understand a user's spoken query. According to some embodiments, the interaction model 414 can interpret the sample sentences and determine the corresponding defined responses or actions corresponding to the specific intent 505.

As described, the fine-tuned language generator model 504 and classifier 602 can be trained for the generation of sentences for an intent. Specifically, the training can use a general-purpose NLG model 502 and finetune it to create a fine-tuned NLG model 504. The fine-tuned NLG model 504 can generate preliminary sentences from keywords obtained from keyword extraction model 404. The finetuning can use training sentences combined with keywords. The keywords can be combined with training sentences through concatenation using concatenation or nullify component 606 for a unidirectional generator model. Alternatively, keywords can be selected, and the unselected words can be nullified for training a bidirectional model to infer words among keywords in sentences. The keywords can be extracted or identified using keyword extraction model 404 from the known, supported sentences associated with an intent. Training data 503 can be obtained from a corpus of domain data.

Domain data can include the text or transcriptions of speech from user requests and indications of whether the requests cause the virtual assistant to give a correct or incorrect response. The training corpus can also include unlabeled sentences and sentences that are not from requests to virtual assistants at all. The corpus of training sentences, labeled as one of the positive examples, negative examples, or unlabeled examples, can be used for training to create a classifier 602. The classifier model can infer the probabilities of sentences generated by the fine-tuned NLG model 504 as being correct.

Figure 7:
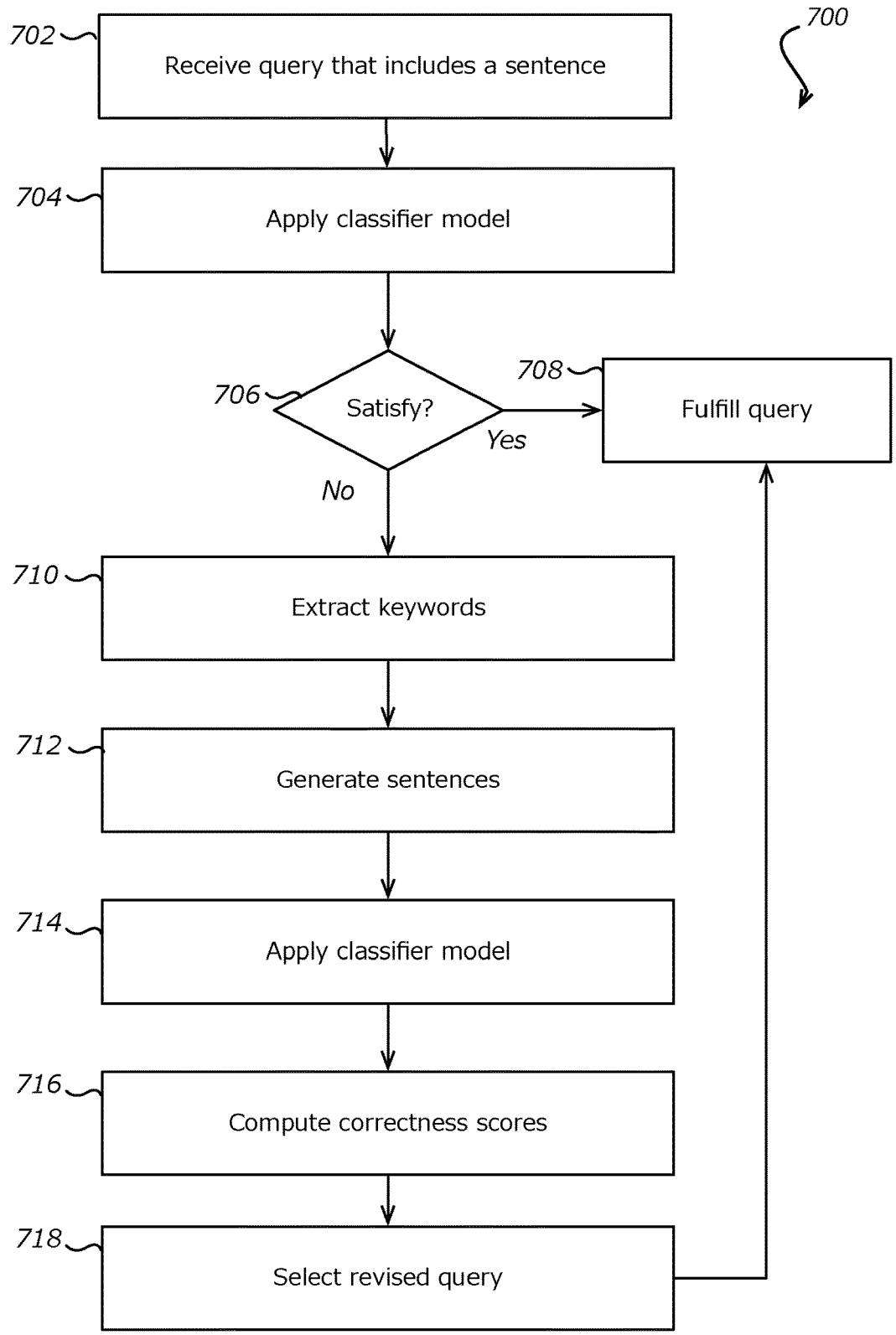
FIG. 7 illustrates an exemplary process for generating sentences in accordance with various embodiments.

FIG. 7 illustrates exemplary process 700 for generating sentences in accordance with various embodiments. In embodiments, the method steps or techniques depicted and described herein can be performed in a processor comprising one or more systems and/or components described herein, the method steps being encoded as processor-executable instructions in a non-transitory memory of one or more computing devices comprising one or more systems and/or components described herein. The techniques of FIG. 7 may be implemented in an operating system kernel, in a separate user process, in a library package bound into network applications, on a specially constructed machine, on an application-specific integrated circuit (ASIC), or a field programmable gate array (FPGA). The process may comprise additional steps, fewer steps, and/or a different order of steps without departing from the scope of the invention as would be apparent to one of ordinary skill in the art.

In this example, a virtual assistant or other appropriate system and/or component can receive 702 an initial query that includes a sentence (e.g., a spoken utterance, text utterance, etc.) The sentence can correspond to an intent. According to some embodiments, the sentence can be a known supported sentence with a correctness score above a threshold. According to some embodiments, the sentence can comprise one or more spoken phrases that a user can speak to invoke the intent. According to some embodiments, the intent can invoke one or more defined actions to be performed by the virtual assistant.

A classifier model is applied 704 to the sentence to determine whether the received sentence satisfies a threshold. In certain embodiments the sentence may satisfy a threshold when a correctness score determined for the sentence satisfies the threshold. In an embodiments, the correctness score can represent the probability that a generated sentence invokes a user's intent.

A determination is made 706 whether the sentence based on its correctness score satisfies the threshold. In the situation the sentence satisfies the threshold, the query can be fulfilled 708 in accordance with one or more configured modalities, including, e.g., providing an audio output (e.g., a voice response), a text response, and/or a visual response, such as one or more frames of video.

In the situation the sentence fails to satisfy the threshold, one or more keywords is extracted 710 from the sentence. In an embodiment, the extracted keywords represent the intent. According to some embodiments, a keyword extraction model can extract the keywords. According to some embodiments, the system can replace one or more keywords with a placeholder representing a specific type of word for more efficient data processing.

Sentences (e.g., sample sentences or generated sentences) are generated 712 with a sentence generation model based on the one or more keywords. In an embodiment, the system can generate, via the sentence generation model, a first set of sentences (e.g., preliminary sentences) based on the extracted keywords. According to some embodiments, the sentence generation model is a general-purpose natural language generation model that has been fine-tuned by associated data. For example, the general-purpose natural language generation model can be fine-tuned by keywords combined with corresponding sentences. It can also be fine-tuned by domain-specific datasets and/or domain identifiers, such as data from domain data store 322. According to some embodiments, the sentence generation model can be unidirectional or bidirectional.

The classifier model is applied 714 to the generated sentences to compute 716 correctness scores for the generated sentences. According to some embodiments, the classifier model can be trained by at least one of positive datasets, negative datasets, and unlabeled datasets. The positive datasets can comprise supported sentences combined with an intent, wherein the supported sentences can invoke the intent. According to some embodiments, the correctness scores infer probabilities of the correctness of a sentence for invoking an intent.

A revised query from the generated sentences can be selected 718 based on the correctness scores. For example, a sentence with a highest correctness score may be selected. In another example, selecting the sentence comprises selecting the sentence from the generated sentences based on vector distances associated with generated sentences, wherein the selected sentence is associated with one of a lowest vector distance or a vector distance satisfying a threshold.

Thereafter, an intent corresponding to the selected sentence can be invoked and the query fulfilled 708. For example, a virtual assistant system can configure a virtual assistant with the selected sentence so that it can invoke the intent and generate the corresponding responses or actions.

Figure 8:
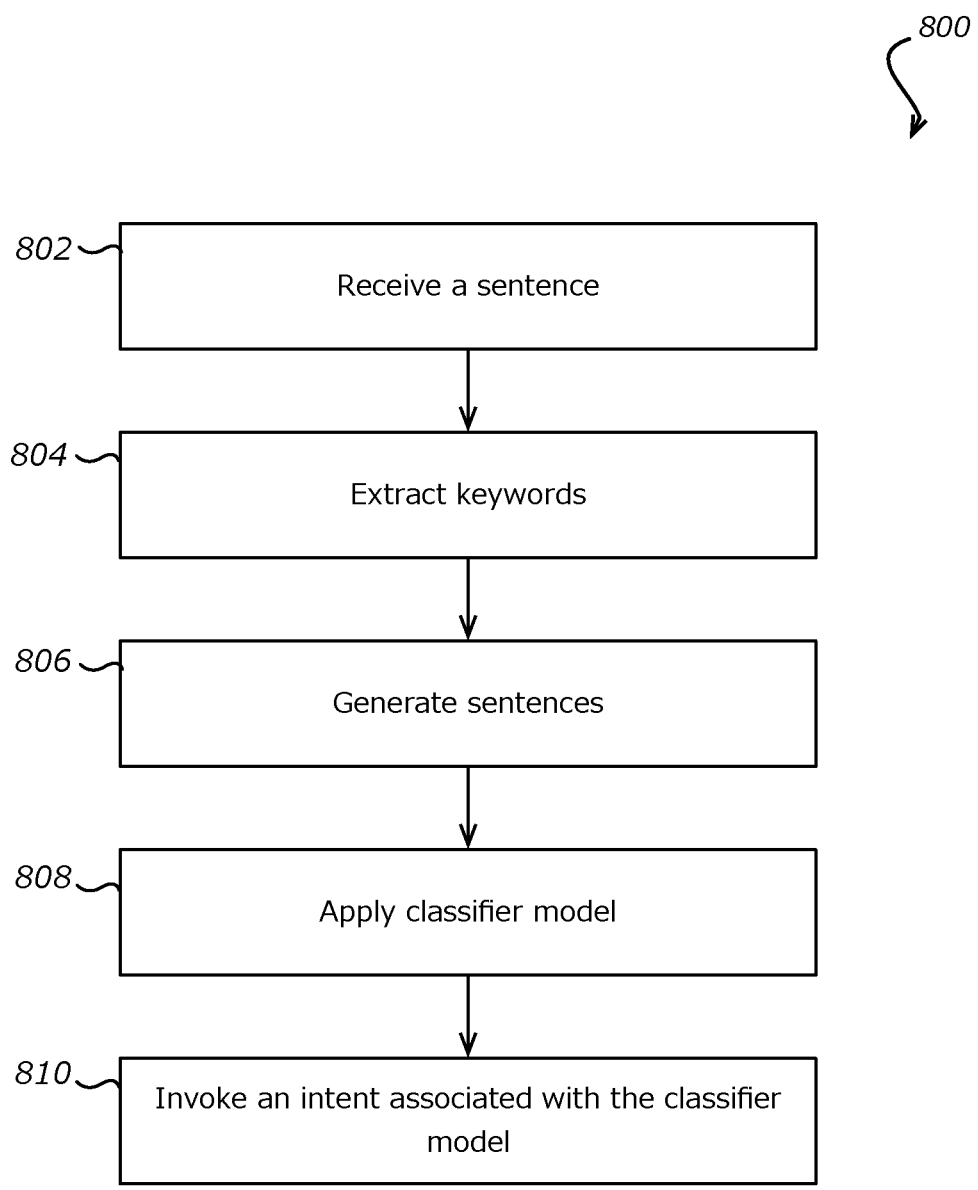
FIG. 8 illustrates an exemplary process for generating sentences in accordance with an alternative embodiment.

FIG. 8 shows an exemplary process 800 for generating sentences in accordance with an alternate embodiment. In this example, a virtual assistant system can receive 802 a sentence (e.g., spoken utterance, text utterance, etc.) The sentence can comprise one or more spoken phrases that a user can speak to invoke an intent, wherein the intent invokes one or more defined actions. The system can extract 804 one or more keywords from the received sentence. In an embodiment, extracting the one or more keywords from the received sentence is based on a keyword extraction model. The system can generate 806, via a sentence generation model, generated sentences based on the one or more keywords. The system can apply 808 a classifier model to the generated sentences to determine a sentence that satisfies a threshold. For example, in accordance with an embodiment, determining a sentence that satisfies a threshold includes selecting a plurality of generated sentences with correctness scores satisfying the threshold and selecting from the generated sentences a sentence associated with a highest correctness score. In the situation the sentence associated with highest correctness, or the sentence otherwise selected, the system can invoke 810 an intent associated with the classifier model as discussed herein.

Figure 9:
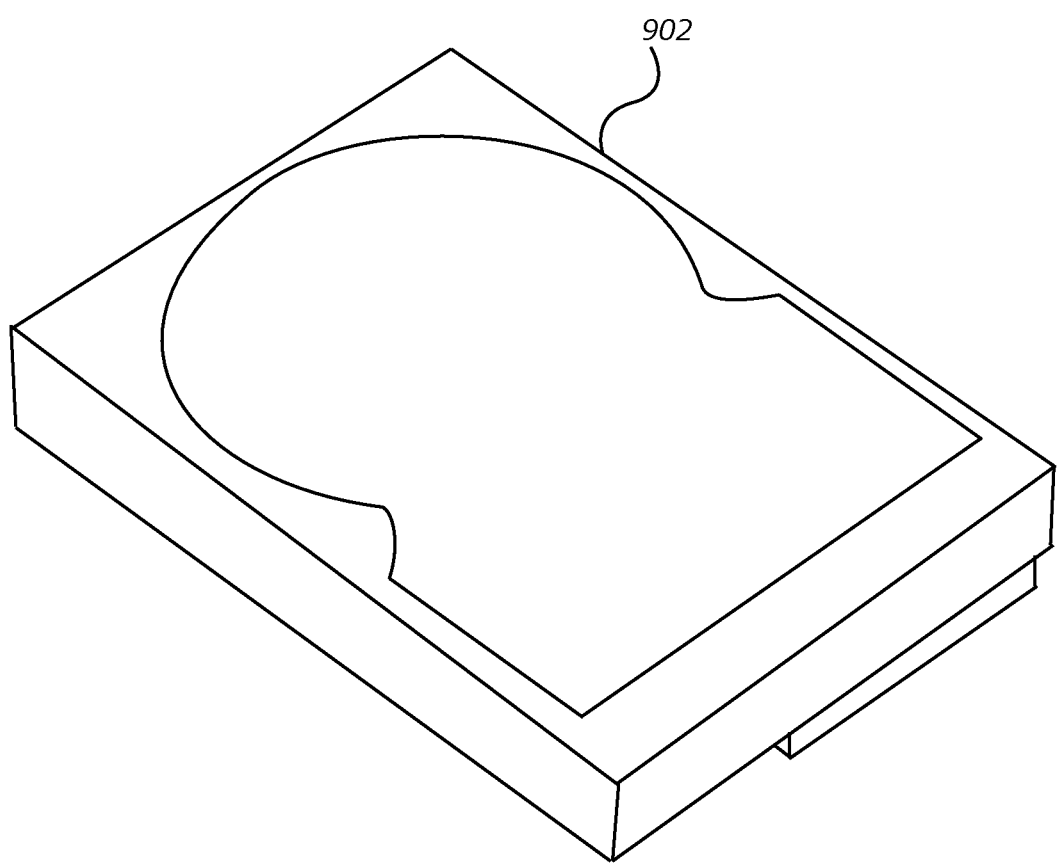
FIG. 9 shows a hard drive, which is an example of a non-transitory computer readable medium, according to one or more embodiments of the present subject matter.

FIG. 9 shows a hard drive, which is an example of a non-transitory computer readable medium. Various examples are implemented with non-transitory computer readable media. FIG. 9 shows an example of a non-transitory computer readable medium 902, a rotating magnetic disk drive. Data centers commonly use magnetic disks to store data and code comprising instructions for server processors. Non-transitory computer readable medium 902 stores code comprising instructions that, if executed by one or more computers, would cause the computers to perform steps of methods described herein. Rotating optical disks and other mechanically moving storage media are possible. Furthermore, stationary storage media such as flash chips and solid-state drives can also store instructions as needed.

Figure 10A:
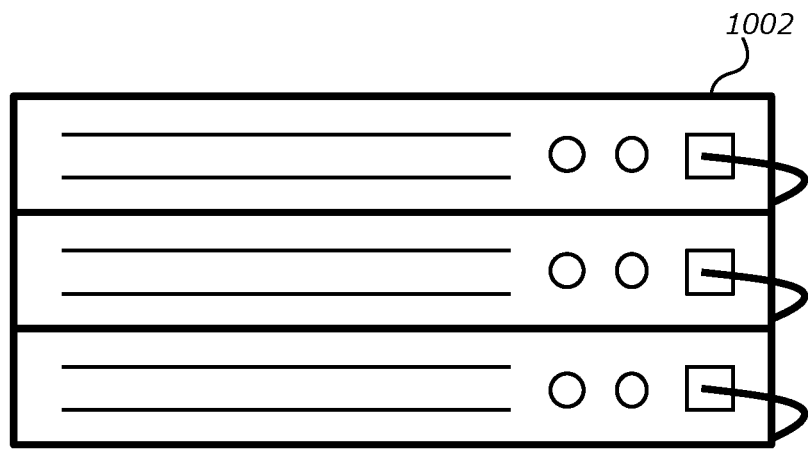
FIG. 10A shows a server system of rack-mounted blades, according to one or more embodiments of the present subject matter.

FIG. 10A shows a server system of rack-mounted blades. Various examples are implemented with cloud servers, such as ones implemented by data centers with rack-mounted server blades. FIG. 10A shows a rack-mounted server blade multi-processor server system 1002. Server system 1002 comprises a multiplicity of network-connected computer processors that run software in parallel.

Figure 10B:
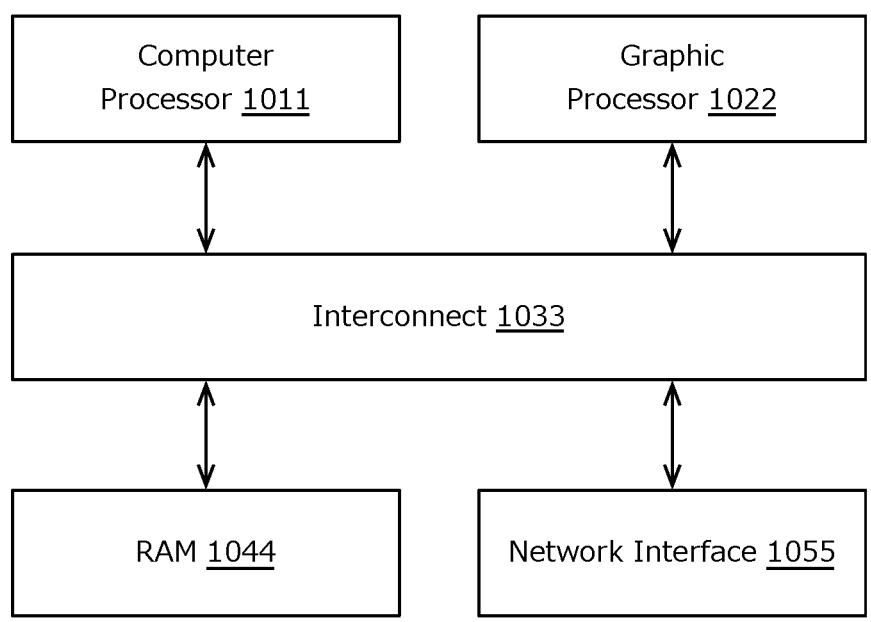
FIG. 10B shows a diagram of a networked data center server, according to one or more embodiments of the present subject matter.

FIG. 10B shows a diagram of a networked data center server, which is one example of a computing system. It comprises a multicore cluster of computer processor (CPU) cores 1011 and a multicore cluster of the graphics processor (GPU) cores 1022. The processors connect through a board-level interconnect 1033 to random-access memory (RAM) devices 1044 for program code and data storage. The server system also comprises a network interface 1055 to allow the processors to access the Internet, non-volatile storage, and input/output interfaces. By executing instructions stored in RAM devices 1044, the CPUs 1011 and GPUs 1022 perform steps of computer-implemented methods described herein.

Examples shown and described use certain spoken languages. Various embodiments work, similarly, for other languages or combinations of languages. Examples shown and described use certain domains of knowledge and capabilities. Various systems work similarly for other domains or combinations of domains.

Several aspects of one implementation of the neural sentence generator and its applications are described. However, various implementations of the present subject matter provide numerous features including, complementing, supplementing, and/or replacing the features described above. In addition, the foregoing description, for purposes of explanation, used specific nomenclature to provide a thorough understanding of the embodiments of the invention. However, it will be apparent to one skilled in the art that the specific details are not required in order to practice the embodiments of the invention.

Some systems are screenless, such as an earpiece, which has no display screen. Some systems are stationary, such as a vending machine. Some systems are mobile, such as an automobile. Some systems are portable, such as a mobile phone. Some systems are for implanting in a human body. Some systems comprise manual interfaces such as keyboards or touchscreens.

Some systems function by running software on general-purpose programmable processors (CPUs) such as ones with ARM or x86 architectures. Some power-sensitive systems and some systems that require especially high performance, such as ones for neural network algorithms, use hardware optimizations. Some systems use dedicated hardware blocks burned into field-programmable gate arrays (FPGAs). Some systems use arrays of graphics processing units (GPUs). Some systems use application-specific-integrated circuits (ASICs) with customized logic to give higher performance.

Some physical machines described and claimed herein are programmable in many variables, combinations of which provide essentially an infinite variety of operating behaviors. Some systems herein are configured by software tools that offer many parameters, combinations of which support essentially an infinite variety of machine embodiments.

Hardware blocks, custom processor instructions, co-processors, and hardware accelerators perform neural network processing or parts of neural network processing algorithms with especially high performance and power efficiency. This enables extended battery life for battery-powered devices and reduces heat removal costs in data centers that serve many client devices simultaneously.

The various computing devices described herein are exemplary and for illustration purposes only. In accordance with the various embodiments described herein, other systems, interfaces, components, databases, and the like, may be used, as would be readily understood by a person of ordinary skill in the art, without departing from the scope of the invention. Any system, interface, component, database, and the like may be divided into a plurality of such elements for achieving the same function without departing from the scope of the invention. Any system, interface, component, database, and the like may be combined or consolidated into fewer of such elements for achieving the same function without departing from the scope of the invention. All functions of the components discussed herein may be initiated manually or may be automatically initiated when the criteria necessary to trigger action have been met. As used herein, sending or receiving data may be the same as sending or receiving one or more signals indicative of the sent or received data.

In accordance with the various embodiments described herein, although the data stores are shown as separate data stores, data from the data stores can be maintained across fewer or additional data stores. The data stores can be accessed by each of the various components in order to perform the functionality of the corresponding component. Other components, systems, services, etc. may access the data stores.

Additionally, the components may be performed by any number of different computers and/or systems. Thus, the components may be separated into multiple services and/or over multiple disparate systems to perform the functionality described herein. In some embodiments, at least a portion of the resources can be "virtual" resources supported by these and/or other components.

One or more links couple one or more systems, engines or devices to a network (e.g., network 252). In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to a network.

In particular embodiments, each system or engine may be a unitary server or may be a distributed server spanning multiple computers or multiple datacenters. Systems may be of various types, such as, for example and without limitation, web server, advertising server, file server, application server, or proxy server. In particular embodiments, each system may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types or may dynamically create or constitute files upon a request and communicate them to client devices or other devices in response to HTTP or other requests from client devices or other devices.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiment, each data storage may be a relational database. Particular embodiments may provide interfaces that enable servers or clients to manage, e.g., retrieve, modify, add, or delete, the information stored in data storage. It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Practitioners skilled in the art will recognize many modifications and variations. Changes may be made in detail, especially matters of structure and management of parts within the principles of the embodiments of the present invention.

Having disclosed exemplary embodiments and the best mode, modifications and variations may be made to the disclosed embodiments while remaining within the scope of the embodiments of the invention as defined by the following claims.

What is claimed is:

1. A computer-implemented method, comprising:
    obtaining training data comprising query data samples, the query data samples including pairs of text data representing queries and responses and corresponding keywords specific to a domain;
    training a domain-specific sentence generation model using the pairs of text data and the corresponding keywords;
    receiving an initial query that includes a sentence;
    extracting one or more keywords from the received sentence;
    determining the one or more keywords are associated with a specific intent;
    generating, via the trained domain-specific sentence generation model, a plurality of generated sentences based on the specific intent;
    applying a classifier model to the generated plurality of sentences to map sentences to the specific intent and to determine one or more sentences with a high probability of having the same specific intent;
    selecting the one or more sentences that are associated with the specific intent, wherein each selected sentence comprise one or more placeholders representing a specific type of word;
    receiving a new client query corresponding to one of the one or more selected sentences; and
    invoking the specific intent corresponding to the one of the one or more selected sentences.

2. The computer-implemented method of claim 1, wherein the classifier model has been trained by supported sentences that are known to invoke the specific intent.

3. The computer-implemented method of claim 1, further comprising:
    wherein selecting the sentence comprises:
    selecting from the generated sentences based on vector distances associated with the generated sentences.

4. The computer-implemented method of claim 1, wherein the selected sentence is associated with one of a lowest vector distance and a vector distance satisfying a threshold.

5. A computer-implemented method, comprising:
    obtaining training data comprising query data samples, the query data samples including pairs of text data representing queries and responses and corresponding keywords specific to a domain;
    training a domain-specific sentence generation model using the pairs of text data and the corresponding keywords;

receiving a sentence;
extracting one or more keywords from the received sentence;
determining the one or more keywords are associated with a specific intent;
generating, via the trained domain-specific sentence generation model, a plurality of generated sentences based on the specific intent;
applying a classifier model to the generated plurality of sentences to map sentences to the specific intent and to determine one or more sentences with a high probability of having the same specific intent;
selecting the one or more sentences that are associated with the specific intent;
receiving a new client query corresponding to one of the one or more selected sentences; and
invoking an intent associated with the classifier model.

6. The computer-implemented method of claim 5, further comprising:
obtaining training data comprising query data samples, the query data samples including pairs of text data representing queries and responses;
calculating vector representations of the pairs of text data; and
clustering the vector representations.

7. The computer-implemented method of claim 6, further comprising:
replacing the pairs of text data for tagged named entities with a named entity type tag, wherein the classifier model recognizes named entity tags.

8. The computer-implemented method of claim 6,
wherein a given vector representation comprises at least a response vector representation, the response vector representation being a vector representation of data representing a response to a query, the response vector representation being paired with data representing a corresponding query, and
wherein clustering the vector representations comprises:
clustering response vector representations based on distances between the response vector representations within vector space.

9. The computer-implemented method of claim 5, wherein the received sentence comprises one or more spoken phrases that a user can speak to invoke the intent, and wherein the intent invokes one or more defined actions.

10. The computer-implemented method of claim 5, wherein extracting the one or more keywords from the sentence is based on a keyword extraction model.

11. The computer-implemented method of claim 5, further comprising:
replacing at least one keyword with a placeholder representing a specific type of word.

12. The computer-implemented method of claim 5, wherein the sentence generation model is a general-purpose natural language generation model fine-tuned by at least one of associated keywords combined with corresponding sentences, domain-specific datasets, and domain identifiers.

13. The computer-implemented method of claim 5, further comprising:
computing, via the classifier model, correctness scores for the generated sentences; and
selecting at least one generated sentence with a correctness score satisfying a threshold, wherein the selected at least one generated sentence that satisfies the threshold is associated with a highest correctness score.

14. The computer-implemented method of claim 13, wherein the classifier model has been trained by supported sentences that are known to invoke the intent.

15. A non-transitory computer readable medium storing instructions that, when executed by at least one processor of a computing system, causes the computing system to:
obtain training data comprising query data samples, the query data samples including pairs of text data representing queries and responses and corresponding keywords specific to a domain;
train a domain-specific sentence generation model using the pairs of text data and the corresponding keywords;
receive a sentence;
extract one or more keywords from the received sentence;
determine the one or more keywords are associated with a specific intent;
generate, via the trained domain-specific sentence generation model, a plurality of generated sentences based on the specific intent;
apply a classifier model to the generated plurality of sentences to map sentences to the specific intent and to determine one or more sentences with a high probability of having the same specific intent;
select the one or more sentences that are associated with the specific intent;
receive a new client query corresponding to one of the one or more selected sentences; and
invoke an intent associated with the classifier model.

16. The non-transitory computer readable medium of claim 15, wherein the instructions, when executed by the at least one processor, further enables the computing system to:
obtain training data comprising query data samples, the query data samples including pairs of text data representing queries and responses;
calculate vector representations of the pairs of text data; and
cluster the vector representations.

17. The non-transitory computer readable medium of claim 16, wherein the instructions, when executed by the at least one processor, further enables the computing system to:
replace the pairs of text data for tagged named entities with a named entity type tag, wherein the classifier model recognizes named entity tags.

18. The non-transitory computer readable medium of claim 16, wherein a given vector representation comprises at least a response vector representation, the response vector representation being a vector representation of data representing a response to a query, the response vector representation being paired with data representing a corresponding query,
wherein the instructions, when executed by the at least one processor to cluster the vector representations, further enables the computing system to:
cluster response vector representations based on distances between the response vector representations within vector space.

19. The non-transitory computer readable medium of claim 16, wherein the received sentence comprises one or more spoken phrases that a user can speak to invoke the intent, and wherein the intent invokes one or more defined actions.

20. The non-transitory computer readable medium of claim 16, wherein extracting the one or more keywords from the sentence is based on a keyword extraction model.

21. The non-transitory computer readable medium of claim 16, wherein the sentence generation model is a general-purpose natural language generation model fine-tuned by at least one of associated keywords combined with corresponding sentences, domain-specific datasets, and domain identifiers.

22. The non-transitory computer readable medium of claim 16, wherein the instructions, when executed by the at least one processor, further enables the computing system to:
compute, via the classifier model, correctness scores for the generated sentences; and
select at least one generated sentence with a correctness score satisfying a threshold, wherein the selected at least one generated sentence that satisfies the threshold is associated with a highest correctness score.

23. The non-transitory computer readable medium of claim 22, wherein the classifier model has been trained by supported sentences that are known to invoke the intent.

* * * * *